(12) United States Patent
Bontrager et al.

(10) Patent No.: US 12,208,547 B2
(45) Date of Patent: Jan. 28, 2025

(54) SYSTEMS FOR PRODUCING MOLDED FIBER PRODUCTS

(71) Applicant: Congruens Group, LLC, San Carlos, CA (US)

(72) Inventors: Rick Bontrager, San Carlos, CA (US); Pablo Gonzalez, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 0 days.

(21) Appl. No.: 17/608,781

(22) PCT Filed: May 6, 2020

(86) PCT No.: PCT/US2020/031675
§ 371 (c)(1),
(2) Date: Nov. 4, 2021

(87) PCT Pub. No.: WO2020/227409
PCT Pub. Date: Nov. 12, 2020

(65) Prior Publication Data
US 2022/0242015 A1    Aug. 4, 2022

Related U.S. Application Data

(60) Provisional application No. 62/844,044, filed on May 6, 2019.

(51) Int. Cl.
*B29C 41/16* (2006.01)
*B29C 31/00* (2006.01)
(Continued)

(52) U.S. Cl.
CPC .............. *B29C 41/16* (2013.01); *B29C 31/00* (2013.01); *B29C 37/02* (2013.01); *B29C 41/42* (2013.01);
(Continued)

(58) Field of Classification Search
CPC ....................................................... B29C 41/16
See application file for complete search history.

(56) References Cited

U.S. PATENT DOCUMENTS 5,078,257 A * 1/1992 Carter, Jr. .............. B65G 37/02
198/346.2
6,210,531 B1 * 4/2001 Bradford ................... D21J 3/00
162/348

(Continued)

FOREIGN PATENT DOCUMENTS

CN      202070636 U      12/2011
CN      107881856 A      4/2018
(Continued)

OTHER PUBLICATIONS

Machine translation of CN 107915044 A, Apr. 17, 2018 (Year: 2018).*

(Continued)

*Primary Examiner* — Benjamin A Schiffman
(74) *Attorney, Agent, or Firm* — Goodwin Procter LLP

(57) ABSTRACT

A molded fiber part production line includes a forming station, a part transfer system, a press station, and a removal system. The forming station includes a slurry tank, a forming mold, and a mold actuation system. The part transfer system includes a part transfer feature and a conveyance mechanism. The press station includes a core mold, a cavity mold compatible with the core mold, and a press actuation system. The removal system includes a removal feature defining a plurality of part vacuum channels and a plurality of trim vacuum channels. The removal system also includes a conveyance mechanism for moving the removal feature from a position in engagement with at least one of the core mold and the cavity mold to another position.

16 Claims, 26 Drawing Sheets

(51) Int. Cl.
  *B29C 37/02* (2006.01)
  *B29C 41/42* (2006.01)
  *B29C 43/02* (2006.01)
  *B29C 43/56* (2006.01)
  *D21J 3/00* (2006.01)
  *B29K 105/00* (2006.01)

(52) U.S. Cl.
  CPC .............. *B29C 43/02* (2013.01); *B29C 43/56* (2013.01); *D21J 3/00* (2013.01); *B29C 2043/561* (2013.01); *B29K 2105/0058* (2013.01)

(56) References Cited

U.S. PATENT DOCUMENTS

| | | | | |
|---|---|---|---|---|
| 6,722,836 | B2* | 4/2004 | Jager | B25J 5/02 |
| | | | | 414/222.01 |
| 9,783,928 | B2* | 10/2017 | Zheng | D21F 7/006 |
| 11,738,485 | B2* | 8/2023 | Gonzalez | B29C 41/38 |
| | | | | 264/517 |
| 2009/0142523 | A1* | 6/2009 | Nilsson | D21J 7/00 |
| | | | | 162/388 |
| 2017/0197334 | A1 | 7/2017 | Kuo | |
| 2018/0340296 | A1* | 11/2018 | Chung | D21J 7/00 |
| 2020/0332473 | A1* | 10/2020 | Yi | D21J 7/00 |

FOREIGN PATENT DOCUMENTS

| | | | | |
|---|---|---|---|---|
| CN | 107915044 | A | | 4/2018 |
| CN | 108265568 | A * | 7/2018 | ............ D21J 3/00 |
| CN | 109454705 | A | | 3/2019 |
| EP | 1240975 | | | 9/2002 |
| EP | 2937462 | B1 | | 7/2019 |
| WO | 99/22069 | | | 5/1999 |
| WO | 2003/044279 | A1 | | 5/2003 |
| WO | 2005/012640 | | | 2/2005 |
| WO | 2006/057610 | | | 6/2006 |
| WO | WO-2020227404 | A1 * | 11/2020 | |
| WO | WO-2022072555 | A1 * | 4/2022 | |
| WO | WO-2023178278 | A2 * | 9/2023 | |

OTHER PUBLICATIONS

Machine translation of CN-108265568-A, Jul. 10, 2018 (Year: 2018).*
PCT International Preliminary Report on Patentability in Application PCT/US2020/031675, mailed Nov. 18, 2021, 7 pages.
PCT International Search Report and Written Opinion in Application PCT/US2020/031667, mailed Jul. 22, 2020, 11 pages.
PCT International Preliminary Report on Patentability in Application PCT/US2020/031667, mailed Nov. 18, 2021, 8 pages.
PCT International Search Report for PCT Application No. PCT/US2020/031675 mailed Jul. 27, 2020 (4 pages).
PCT Written Opinion for PCT Application No. PCT/US2020/031675 mailed Jul. 27, 2020 (5 pages).

* cited by examiner

SYSTEMS FOR PRODUCING MOLDED FIBER PRODUCTS

CROSS-REFERENCE TO RELATED APPLICATIONS

This application is a National Stage Application of PCT/US2020/031675, filed 6 May 2020, which claims the benefit of U.S. Provisional Patent Application Ser. No. 62/844,044, filed May 6, 2019, and which is entitled "IMPROVED PRODUCTION LINE FOR PRODUCING MOLDED FIBER PRODUCTS," the disclosure of which is hereby incorporated by reference herein in its entirety.

INTRODUCTION

Pollution caused by single use plastic containers and packaging materials is now a recognized worldwide problem. Replacing single use packaging with biodegradable and compostable materials is proposed as one way to reduce plastic pollution. However, for a new environmentally-friendly replacement to be successful, it must be competitive in both cost and performance to the incumbent plastic technologies it is to replace.

By way of brief background, molded paper pulp (also referred to as molded fiber) has been used since the 1930s to make containers, trays and other packages. Paper pulp can be produced from recycled materials such as old newsprint and corrugated boxes or directly from tree and other plant fibers. Today, molded pulp packaging is widely used for electronics, household goods, automotive parts and medical products.

Molds are made by machining a metal tool in the shape of a mirror image, if you will, of the finished part. Holes are drilled through the tool and then a screen is attached to its surface. The vacuum is drawn through the holes while the screen prevents the pulp from clogging the holes. To make the molded fiber part, the mold is immersed into a slurry of fiber and a pressure gradient is applied and water is drawn through the holes in the mold. Fiber from the slurry is collected on the screen and, after the fiber layer is formed to a desired thickness, the mold with the molded fiber part is removed from the slurry. The molded fiber part is then disengaged from the mold and may be subjected to subsequent processing (e.g., forming, heating, drying, top coating, and the like).

Molded fiber packaging products can be biodegradable and compostable. However, presently known fiber technologies are not well suited for use in food packaging where the food can come into contact with the packaging, particularly meat and poultry containers, prepared food, produce, microwavable food containers, and lids and cups for beverage containers.

SUMMARY

In one aspect, the technology relates to a molded fiber part production line including: (a) a forming station including: a slurry tank configured to receive a fiber slurry including a plurality of fiber and a liquid; a forming mold including a mold plate defining a plurality of vacuum channels; and a mold actuation system for adjusting a position of the mold plate relative to the slurry tank; (b) a part transfer system including: a part transfer feature defining a plurality of part vacuum channels; and a conveyance mechanism for moving the part transfer feature from a first position in engagement with the forming mold to a second position; (c) a press station including: a core mold; a cavity mold compatible with the core mold; and a press actuation system for adjusting a position of the core mold relative to the cavity mold, wherein at least one of the core mold and the cavity mold defines a plurality of vacuum channels and at least one heating element, and wherein in the second position, the part transfer feature is in engagement with at least one of the core mold and the cavity mold; and (d) a removal system including: a removal feature defining a plurality of part vacuum channels and a plurality of trim vacuum channels; and a conveyance mechanism for moving the removal feature from a third position in engagement with at least one of the core mold and the cavity mold to a fourth position. In an example, the part transfer feature includes a part transfer mold compatible with the forming mold. In another example, the part transfer system conveyance mechanism includes a robotic arm. In yet another example, the part transfer system conveyance mechanism includes a shuttle disposed on a gantry. In still another example, the gantry extends in a first direction away from the forming mold and an opposite, second direction away from the forming mold.

In another example of the above aspect, the both of the core mold and the cavity mold define the plurality of vacuum channels. In an example, the at least one heating element includes a plurality of heating elements, and wherein both of the core mold and the cavity mold include at least one of the plurality of heating elements. In another example, at least one of the core mold and the cavity mold includes a trimmer. In yet another example, the trimmer includes a ring-shaped projection extending from the at least one of the core mold and the cavity mold. In still another example, the trimmer is fixed relative to the at least one of the core mold and the cavity mold.

In another example of the above aspect, the trimmer and the at least one of the core mold and the cavity mold are a unitary part. In an example, the trimmer is movable relative to the at least one of the core mold and the cavity mold. In another example, the trimmer is disposed proximate a perimeter of the at least one of the core mold and the cavity mold. In yet another example, the removal feature includes a removal mold. In still another example, the removal feature includes a plurality of vacuum cups.

In another example of the above aspect, the removal feature includes: a part removal port communicatively coupled to the at least one part vacuum channel; and a trim removal port communicatively coupled to the at least one trim vacuum channel. In an example, the at least one part vacuum channel is communicatively coupled to a part vacuum source and the at least one trim vacuum channel is communicatively coupled to a trim vacuum source discrete from the part vacuum source. In another example, the removal system conveyance mechanism includes a robotic arm. In yet another example, the removal system conveyance mechanism includes a shuttle disposed on a gantry. In still another example, the removal system is the part transfer system.

In another example of the above aspect, the molded fiber production line further includes a trim station, wherein when in the fourth position, the removal feature is in engagement with the trim station. In an example, the trim station includes a registration feature and trimmer. In another example, the trimmer includes a ring-shaped projection extending from the registration feature. In yet another example, the trimmer is fixed relative to the registration feature. In still another example, the trimmer and the registration feature include a unitary part.

In another example of the above aspect, the molded fiber part production line includes a waste station, wherein when in the fourth position, the removal feature is in engagement with the waste station. In an example, in the fourth position, a controller terminates an application of a trim vacuum to the at least one trim channel. In another example, the molded fiber part production line includes a print station, wherein when in the fourth position, the removal feature is in engagement with the print station. In yet another example, the print station includes a registration feature. In still another example, the print station includes at least one print device.

In another example of the above aspect, the at least one print device includes at least one of a screen printer, a laser printer, an inkjet printer, and a pad printer. In an example, the molded fiber part production line includes a stacking station. In another example, at least one of the part transfer system and the removal system includes at least one of a robotic arm, a shuttle, and a conveyor.

In another aspect, the technology relates to a method of producing a molded fiber part, the method including: disposing a forming mold defining a plurality of vacuum channels into a slurry tank including a plurality of fibers and a liquid; actuating a vacuum communicatively coupled to the plurality of vacuum channels to draw at least some of the plurality of fibers onto the forming mold to form a partially-formed molded fiber part; removing the forming mold from the slurry tank; transferring the partially-formed molded fiber part to a press including a heating element; applying a compressive pressure to the partially-formed molded fiber part with the press; applying an elevated temperature to the partially-formed molded fiber part with the heating element, wherein application of the compressive pressure and the elevated temperature substantially solidifies the partially-formed molded fiber part into the molded fiber part; separating a waste trim from the molded fiber part; transferring the molded fiber part and the waste trim to a waste station; releasing the waste trim at the waste station; and subsequent to releasing the waste trim, transferring the molded fiber part to a downstream station. In an example, the method includes drawing a portion of the liquid into the plurality of vacuum channels upon actuation of the vacuum. In another example, the method includes recirculating the portion of the liquid into the slurry tank. In yet another example, the method further includes terminating actuation of the vacuum subsequent to removing the forming mold from the slurry tank. In still another example, the method further includes contacting the partially-formed molded fiber part with a part transfer feature prior to transferring the partially-formed molded fiber part to the press.

In another example of the above aspect, transferring the partially-formed molded fiber part is performed with the part transfer feature. In an example, transferring the partially-formed molded fiber part includes moving the part transfer feature in a linear direction. In another example, transferring the partially-formed molded fiber part includes moving the part transfer feature in a rotational direction. In yet another example of the above aspect, the method includes applying a vacuum pressure to the partially-formed molded fiber part with a vacuum source associated with the press. In still another example, the vacuum pressure is applied substantially simultaneously with the application of the compressive pressure.

In another example of the above aspect, the vacuum source is communicatively coupled to a plurality of vacuum channels defined by at least a portion of the press. In an example, the separating of the waste trim is performed substantially simultaneously with the application of the compressive pressure. In another example, the separating of the waste trim is performed after the application of the compressive pressure. In yet another example of the above aspect, transferring the molded fiber part and the waste trim is performed with a removal feature. In still another example, transferring the molded fiber part and the waste trim includes moving the removal feature in a linear direction.

In another example of the above aspect, transferring the molded fiber part and the waste trim includes moving the removal feature in a rotational direction. In an example, the removal feature defines a plurality of molded fiber part vacuum channels and a plurality of waste trim vacuum channels. In another example, transferring the molded fiber part and the waste trim includes: applying a molded fiber part vacuum pressure to the plurality of molded fiber part vacuum channels; and applying a waste trim vacuum pressure to the plurality of waste trim vacuum channels. In yet another example of the above aspect, the method includes terminating the application of the waste trim vacuum pressure at the waste station. In still another example, the method includes performing at least one downstream operation at a downstream station.

In another example of the above aspect, the downstream operation includes at least one of a printing operation, a quality control operation, and a stacking operation. In an example, the downstream operation includes the printing operation, and wherein the method further includes aligning the molded fiber part with a registration feature. In another example, the method includes applying at least one color to the molded fiber part. In yet another example, the downstream operation includes the quality control operation, and wherein the method further includes testing the molded fiber part by performing at least one of emitting a light at the molded fiber part, weighing the molded fiber part, sampling the molded fiber part, and measuring a portion of the molded fiber part. In still another example, the method includes performing a dispositive action based at least in part on the testing of the molded fiber part.

In another example of the above aspect, performing the dispositive action includes at least one of preparing the molded fiber part for shipping and discarding the molded fiber part. In an example, the downstream operation includes the stacking operation, wherein the molded fiber part comprises a plurality of molded fiber parts, and wherein the method further includes stacking the plurality of molded fiber parts.

In another aspect, the technology relates to a system including: at least one processor; and memory, operatively connected to the at least one processor and storing instructions that, when executed by the at least one processor, cause the system to perform a set of operations, the set of operations including: disposing a forming mold defining a plurality of vacuum channels into a slurry tank including a plurality of fibers and a liquid; actuating a vacuum communicatively coupled to the plurality of vacuum channels to draw at least some of the plurality of fibers onto the forming mold to form a partially-formed molded fiber part; removing the forming mold from the slurry tank; transferring the partially-formed molded fiber part to a press including a heating element; applying a compressive pressure to the partially-formed molded fiber part with the press; applying an elevated temperature to the partially-formed molded fiber part with the heating element, wherein application of the compressive pressure and the elevated temperature substantially solidifies the partially-formed molded fiber part into the molded fiber part; separating a waste trim from the molded fiber part; transferring the molded fiber part and the waste trim to a waste station; releasing the waste trim at the waste station; and subsequent to releasing the waste trim, transferring the molded fiber part to a downstream station. In an example, the operations further include drawing a portion of the liquid into the plurality of vacuum channels upon actuation of the vacuum. In another example, the operations further include recirculating the portion of the liquid into the slurry tank. In yet another example, the operations further include terminating actuation of the vacuum subsequent to removing the forming mold from the slurry tank. In still another example, the operations further include contacting the partially-formed molded fiber part with a part transfer feature prior to transferring the partially-formed molded fiber part to the press.

In another example of the above aspect, the operations further include applying a vacuum pressure to the partially-formed molded fiber part with a vacuum source associated with the press. In an example, the operation of transferring the molded fiber part and the waste trim includes: applying a molded fiber part vacuum pressure to the plurality of molded fiber part vacuum channels; and applying a waste trim vacuum pressure to the plurality of waste trim vacuum channels. In another example, the operations further include terminating the application of the waste trim vacuum pressure at the waste station. In yet another example, the operations further include performing at least one downstream operation at a downstream station. In still another example, the downstream operation includes at least one of a printing operation, a quality control operation, and a stacking operation.

In another example of the above aspect, the downstream operation includes the printing operation, and wherein the operations further include aligning the molded fiber part with a registration feature. In an example, the operations further include applying at least one color to the molded fiber part. In another example, the downstream operation includes the quality control operation, and wherein the operations further include testing the molded fiber part by performing at least one of emitting a light at the molded fiber part, weighing the molded fiber part, sampling the molded fiber part, and measuring a portion of the molded fiber part. In yet another example, the operations further include performing a dispositive action based at least in part on the testing of the molded fiber part. In still another example, performing the dispositive action includes at least one of preparing the molded fiber part for shipping and discarding the molded fiber part. In another example, the downstream operation includes the stacking operation, and wherein operations further include stacking a plurality of molded fiber parts.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

DETAILED DESCRIPTION

Figure 1:
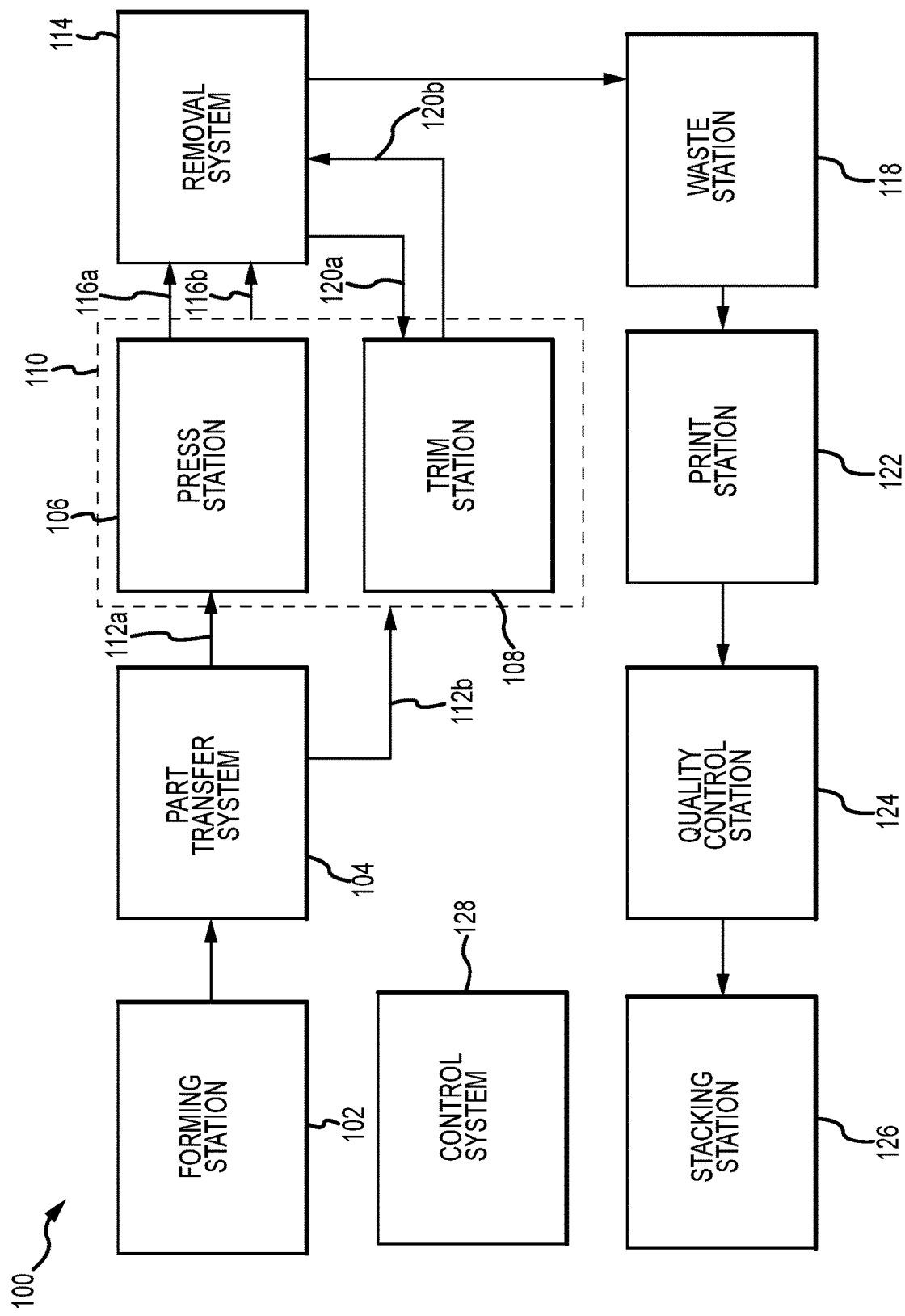
FIG. 1 depicts a schematic of an example molded fiber part production line.

Before the production lines for producing molded fiber products are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments of the production line and components thereof only and is not intended to be limiting. It must be noted that, as used in this specification, the singular forms "a," "an," and "the" include plural referents unless the context clearly dictates otherwise. Thus, for example, reference to "a step" may include multiple steps, and reference to "producing" or "products" of a step or action should not be taken to be all of the products.

Various embodiments of the technology described below relate to the manufacture of fiber-based or pulp-based products for use both within and outside of the food and beverage industry. By way of non-limiting example, the present disclosure relates to the automated, efficient, high-speed production of fiber-based containers. The fiber-based products are adapted to replace their plastic counterparts in a wide variety of applications such as, for example: frozen, refrigerated, and non-refrigerated foods; medical, pharmaceutical, and biological applications; microwavable food containers; beverages; comestible and non-comestible liquids; substances which liberate water, oil, and/or water vapor during storage, shipment, and preparation (e.g., cooking); horticultural applications including consumable and landscaping/gardening plants, flowers, herbs, shrubs, and trees; single-use or disposable storage and dispensing apparatuses (e.g., paint trays, food trays, brush handles, protective covers for shipping); produce (including human and animal foodstuffs such as fruits and vegetables); salads; prepared foods; packaging for meat, poultry, and fish; lids; cups; bottles; guides and separators for processing and displaying the foregoing; edge and corner pieces for packing, storing, and shipping electronics, mirrors, fine art, and other fragile components; buckets; tubes; industrial, automotive, marine, aerospace and military components such as gaskets, spacers, seals, cushions, and the like; and associated molds, wire mesh forms, recipes, processes, chemical formulae, tooling, slurry distribution, chemical monitoring, chemical infusion, and related systems, apparatus, methods, and techniques for manufacturing the foregoing components.

An existing production line for manufacturing molded fiber parts or products is described in Chinese Patent Application No. 201711129438.X (hereinafter, "the '438 application"), entitled "Flexible Production Line for Producing Pulp Molded Products," which is hereby incorporated by reference herein in its entirety. The '438 application describes generally a forming station that includes a former that creates a wet part by dipping a first mold into a tank of fiber slurry, drawing fiber onto the mold until a desired amount of fiber is collected on the screen, and then removing the mold with the attached fiber layer from the slurry. In the system described in the '438 application, the forming station also subjects the wet part to a forming operation in which the first mold with the attached layer of fiber is pressed into a second mold after it is removed from the slurry. This forming operation removes some water from the wet part and contours the surface of the wet part opposite the first mold. In the production line of the '438 application, after the molded fiber part is created by the forming station, it is then pressed in a pressing station. The pressing station may be a plurality of pressing stations, operating in parallel. In one example of the '438 application, four pressing stations are utilized. Each of the four pressing stations in the '438 application includes a single press. Parts are sent to a stacking station after pressing. The forming station, pressing stations, and stacking station are arranged in a circle around a centrally located robot controlling an extendable robotic arm. The robot and robotic arm are configured to remove formed parts from the forming station and transfer them to any one of the four pressing stations. The robotic arm is further configured to remove pressed parts from any the pressing stations and transfer them to either a different one of the pressing stations or to the stacking station. Although the application depicts a number of basic components and stations of a molded fiber part manufacturing line, it unfortunately displays a number of inefficiencies.

FIG. 1 depicts a schematic of an example molded fiber part production line 100. The line 100 is depicted having a number of stations and systems for moving partially-formed and formed parts between various stations of the line 100. The various stations and systems, as well as particular configurations of the line 100 itself, are described further herein. A forming station 102 includes generally a forming mold, a slurry tank, and an actuation system that moves the forming mold relative to the slurry tank (typically by lowering the mold into the slurry tank). Forming stations are available, for example, from Nanya Pulp Molding Equipment Co., Ltd., of Guangzhou, China. The slurry tank includes a fiber slurry that includes wood fibers in a liquid. The forming mold itself includes a number of vacuum channels that are connected to a vacuum source. The forming mold may have a number of discrete molds for making, typically, a plurality of identical fiber parts, although forming molds that are used to form different parts are also contemplated. In an example, the forming mold may include a mold body or plate that includes the required contours, features, etc., for a particular product. The vacuum channels of the mold body may have deliberate paths or layouts within the mold body, or may be formed randomly therein as part of the mold manufacturing process. Some mold bodies may include thereon a screen or mesh that forms the surface upon which the fibers are drawn during the forming process. In use, the actuation system lowers the forming mold into the slurry tank and the associated vacuum source is activated. This draws the slurry liquid into the vacuum channels, thereby leaving fibers disposed on the surface of the forming mold or the mesh, if present. When a desired amount of fibers are drawn onto the surface or mesh, the actuation system raises the forming mold from the slurry. At this point in the process the fibers disposed on the forming mold are referred to herein as a partially-molded fiber part, in that it includes the general contours and features of a finished molded fiber part, but does not display the performance characteristics of a finished part.

The partially-formed molded fiber part may then be removed from the forming mold for further processing. This operation may be performed by a part transfer system 104 including a part transfer feature that may be a part transfer mold that substantially corresponds to or is compatible with the forming mold. In that regard, the part transfer mold also performs a function of forming surfaces of the partially-molded fiber part disposed opposite the surfaces of the partially-molded fiber part that contact the forming mold. The part transfer mold may also include or define a number of vacuum channels (as described above in the context of the forming mold) that are connected to a vacuum source. In use, the part transfer mold is positioned so as to contact the partially-formed molded fiber part. This contact forms the opposite surface of the partially-formed molded fiber part. Upon actuation of the vacuum source, the partially-formed molded fiber parts are removed from the forming mold. The part transfer system 104 includes a conveyance system that moves the part transfer mold from the forming station 102 to a downstream station, in this case, a press station 106. In that regard, the forming station 102 and the press station 106 may form the terminal ends of a range of motion of the part transfer system 104, which in examples may be referred to as a first position and a second position, respectively. Depending on the cycle time of the forming station 102 and the press station 106, the second position may be an intermediate wait station where the part transfer feature may be positioned to wait for the press station 106 to become available.

The production line 100 includes a press station 106 and a trim station 108, or in examples, a combination press/trim station 110 (depicted by the dashed line in FIG. 1). The press station 106 utilizes a combination of compressive pressure and elevated temperature to substantially solidify the partially-formed molded fiber part into the molded fiber part (which meets the general performance requirements to be used). The trim station 108 removes excess material that is formed as part of the pressing operation. The part transfer system 104 may transfer the partially-formed fiber part to the press station 106 (as depicted by arrow 112a) or may transfer the partially-formed fiber part to the combination press/trim station 110 (as depicted by arrow 112b). The discrete press station 106 includes two molds, referred to generally as a core mold and a corresponding and compatible cavity mold. Regardless of terminology used, the core mold and cavity mold form the two generally opposing surfaces of a formed fiber part. These two molds are generally similar in construction to the forming mold and transfer mold described above as required in order to form the partially-formed fiber part into the formed fiber part. As such, the transfer 112a may occur by the part transfer feature of the part transfer system 104 substantially mating with either of the core mold or the cavity mold. Vacuum channels may be formed in either or both of the core mold and cavity mold and connected to a dedicated vacuum source. The vacuum source for the mold in engagement with the transfer feature during transfer 112a may be activated so as to transfer the partially-molded fiber part to the appropriate mold of the press. Heating elements may be disposed in either or both of the core mold and cavity mold. The core mold and cavity mold are moved relative to each other by a press actuation system that in examples is a hydraulic press. As the press actuation system decreases the separation distance between the core mold and the cavity mold (with the partially-formed fiber part therebetween), the increased compressive pressure helps form the part into the molded fiber part. The increased compressive pressure squeezes additional liquid from the partially-formed fiber part, which may be removed from the press station by one of more vacuum sources connected to the vacuum channels present in either or both of the core mold and the cavity mold. Further, the elevated temperature generated by the heating elements helps to further form and dry the partially-formed fiber part until a part more consistent with the formed fiber part is produced therefrom.

A removal system 114 removes the molded fiber parts from the press station 106. The removal system may include a removal feature that includes a plurality of vacuum channels. If the line 100 includes discrete press 106 and trim 108 stations, the plurality of vacuum channels in the removal feature may be utilized to remove the part from the press station 106. The removal feature may be in the form of a removal mold configured to be compatible with the either of the core mold and the cavity mold. The vacuum channels, in that case are in communication with one or more ports on the surface of the removal mold such that vacuum pressure may draw the formed fiber part off of the core mold or cavity mold. In another example, the removal feature may be a plurality of vacuum cups connected to the vacuum channels. Vacuum pressure applied to the channels by the vacuum source may also remove the formed fiber part from the core mold or the cavity mold. The removal system 114 includes a conveyance mechanism that moves the removal feature from the position in engagement with the particular mold of the press station to a downstream station. If discrete press 106 and trim 108 stations are utilized, the removal system 114 moves the removal feature (carrying the formed fiber product) to the trim station 108, along path 120a.

The pressing of the partially-formed fiber part in the press station 106 may result in at least a portion of the partially-formed fiber part being expelled from a perimeter edge of core mold and/or the cavity mold. This excess material must be removed for aesthetic and/or functional purposes. The trim station may be a fixed blade trim station, for example, where a perimeter blade is lowered or otherwise brought into contact with the molded fiber part to remove portions of the part typically proximate an edge thereon. The trim station may include a mold or other registration feature that ensure the molded fiber part is properly positioned thereon, prior to trimming the part with the trimmer. When the removal feature of the removal system 114 is engaged with the registration feature of the trim station 108, the trimming operation may be performed. In another example, the removal feature may engage with the registration feature so as to deposit the molded fiber part for subsequent trimming. The trimmer may be a fixed blade (e.g., in the form of a ring-shaped projection extending from the registration feature). In an example, the trimmer may be fixed relative to the location of the registration feature, e.g., and located about the perimeter of where the registration feature will locate the molded fiber part. In other examples, the trimmer blade and the registration feature may be unitary part. Removed portions of the molded fiber part may be referred to herein as "trim" or "waste trim." Once the trim portions are cut from the molded fiber part, the removal system 114 may again move the molded fiber part from the trim station to a downstream station. Downstream stations in this context may be one or more of a waste station 118, a print station 122, a quality control station 124, and a stacking station 126, each of which are described below.

Since the press station 106 and the trim station 108 may be integrated into a single station (as depicted with line 110 in FIG. 1), a further example is described below. An integrated press/trim station 110 may include a core mold or cavity mold having a trimmer thereon, for example in the form of a fixed trim blade typically used at a discrete trim station. In examples, the trimmer may be in the form of a ring-shaped projection that extends from the respective mold, for example, proximate a perimeter thereof. The trimmer blade may be an element fixed relative to the associated mold, or may move relative thereto, for example, with a dedicated actuation system. If fixed to the mold, it may be advantageous for the trimmer to form a unitary part with the mold. A trimmer blade made from a material different than that of the mold may expand and/or contract at different rates, which may cause improper performance.

For a production line 100 that utilizes the integrated press/trim station, the removal system 114 may be utilized to remove both the molded fiber part, as well as any trim from the press, to prevent trim material from potentially interfering with a subsequent pressing operation. In such a removal system 114, a removal feature having two systems of vacuum channels may be utilized. For example, the removal system may include one or more part vacuum channels and one or more trim vacuum channels, each of which may be served by a discrete vacuum source. If a transfer feature in the form of a transfer mold is utilized, appropriately positioned ports (typically within the portion of the mold corresponding to the location of the finished molded fiber part) in the surface of the mold may be communicatively coupled to the part vacuum channels and part vacuum source; ports in surface of the mold that do not correspond to the location of the finished molded fiber part may be communicatively coupled to the trim vacuum channels and trim vacuum source. Thus, both the molded fiber part and trim may be removed simultaneously from the press/trim station 110 by the removal feature 114. In the alternative, vacuum cups dedicated to the molded fiber part and to the trim may be appropriately located. Further, depending on the configuration of the line, the removal system 114 may be the same system as the part transfer system 104. Such configurations are depicted below.

A waste station 118 is downstream of the removal system 114. The waste station 118 may include a system for capturing trim from the removal system and reintroducing the trim into the slurry system. In an example, the waste station may be a bin, chute, or other structure into which the trim may be released from the removal system 114. When the removal system is appropriately positioned relative to the waste station 118, the trim vacuum source may be turned off or terminated, so that the trim may disengage from or otherwise fall from the removal feature. Appropriate positioning may correspond to physical engagement between the removal feature and the waste station, or the position of the removal feature may be detected relative to the waste station, via proximity, optical, or other sensors. Part vacuum pressure is maintained at the waste station 118, such that the molded fiber parts are not released into the waste station 118. In certain configurations, however, part vacuum pressure may be released to discard damaged or otherwise undesirable parts to the waste station 118.

Subsequent to the waste station 118, the molded fiber part is considered generally sufficiently formed for use. However, other downstream stations may be utilized to add graphics, logos, or other visual information to each molded fiber part, check the quality of the finished parts, or stack or otherwise pack the molded fiber parts for delivery. As such, a downstream print station 122, a quality control station 124, and a stacking station 126 are depicted. These optional stations are described in further detail below.

The entire production line 100 may be automated and controlled by a control system 128 as shown. The control system 128 may be connected to, and control the operation of, each station and even subcomponents of each station, as well as the transfer and removal systems (in the form of conveyors, robots and other devices, as described elsewhere herein). As discussed further below, the control system 128 may monitor the operation and conditions on the production line 100 continuously and adjust operation to ensure proper functioning and quality of the final parts.

Control of all operational parameters is anticipated to improve the quality of the formed fiber parts and increase yield of the production line 100. To obtain such control, a sensor network throughout the production line 100 is contemplated. In an example, various sensors are provided at each station and on each conveyance system to monitor any pertinent parameter of the operation of the production line 100. The temperature control of the heated molds of the press station is one example of such monitoring. Signals from such sensors may be sent to and processed by the control system 128. As another example, the press station 106 may be dynamically controlled based on sensors in the station 106. That is, the press station 106 may be operated until a desired state in the formed fiber part is obtained. In an example, one of the molds in the press station 106 may be provided with one or more sensors that monitor, directly or indirectly, a state of the formed fiber part. For example, a temperature sensor on the surface of the mold could be provided to monitor a temperature of the formed part at a location where it contacts the mold. Similarly, a pressure sensor, a humidity sensor, a light emitter/sensor pair, a conductance sensor, an electrode or electrodes monitoring the flow of current through the formed part, or any other such monitoring device or devices could be provided at one or more locations on the mold. Based on the output of the sensors, the time allotted to press the formed part could be dynamically controlled by the control system 128. For example, upon reaching a desired temperature (e.g., a predetermined temperature threshold) as determined by a temperature sensor, the pressing operation may be terminated.

Such monitoring sensors are not limited to being located in or on the press station 106 and could be located at any place in the production line 100. In one example, white water flow associated with the forming station 102 could be monitored via one or more flow sensors. This allows the flowrate and quantity of white water removed from the partially-formed fiber part to be monitored over time throughout the various stations of the entire production line 100. This allows, e.g., the press station, to be controlled based on the quantity and flow rate of water observed during the operation. Upon determining that the water flow rate or quantity have reached a predetermined threshold (e.g., the flow rate has dropped by 90% since the start of the operation, or after collecting 10 ml of water from the part during a pressing operation), the pressing operation may be terminated regardless of how long the operation has taken.

Such monitoring data could also be used to do more than simply control how long the press station 106 or any other component operates. In an example, the press station 106 could increase or decrease pressure dynamically based on the data collected. In this way, it is conceivable that any controlled operational parameter (e.g., press operation time, press pressure, mold temperature, slurry temperature, vacuum pressure, slurry flow rate, slurry quality, mix tank temperature, conveyor speed or temperature, dryer temperature, ink flow rate, or any other operational setting related to time, temperature, pressure, or movement of a component of the production line) could be controlled in response to data obtained from the one or more sensors.

The production line 100 in FIG. 1 may be operated in a continuous mode. The various stations and part transfer systems may be continuously moving and parts on the production line 100 are pressed, trimmed, printed, and dried while in motion. For example, in an example the quality control station may be a simple pass through station through which a conveyor passes while the parts are tested, as described herein. The printing station may be one or more movable or fixed print heads that print onto the part as the part passes under the print heads.

Other configurations are also possible. For example, a semi-continuous configuration could be provided in which one or more of the stations removes the part from the production line 100 for some period of time and then replaces it when a subsequent station's operation is complete. In a different semi-continuous configuration, the part transfer system 104 may operate in a stop-start mode in which, on a prescribed schedule, the part transfer system 104 moves a predetermined distance and stops. In this way, each part is moved between stations over time. In an example, one or more of the part transfer system 104 and removal system 114 may have part transfer features in the form of molds, such as core molds as described herein, incorporated into the appropriate system 102, 114. The molds may provide positive retention of the parts during movement thereof. The press stations could then have the outside mold which receives the part when it reaches the station.

The production line 100 in FIG. 1 has several advantages. It has inherent expandability in that multiple parallel press stations 106, trim stations 108, waste stations 118 may be operated simultaneously, with a part transfer system 104 and a removal system 114 serving the various stations. In such parallel configurations, each of the parallel portions may be referred to as "sub-lines." In another example, each of the parallel sub-lines may be dedicated to a different customer having different printing requirements, finished part requirements (thus different pressing and/or drying requirements). Further, as another example, multiple stacking stations 126 would allow for the different customer parts to be stacked separately in an easily automated fashion. The parallel configuration of multiple sub-lines adds resilience to the production line 100 in that any one station in the sub-lines could fail without bringing the entire production line 100 to a stop. Further resilience could be provided by including a second forming station 102. At any given time, different sub-lines may be taken out of operation without affecting the operation of the other sub-lines. Thus, a sub-line dedicated to a specific product may be inoperative until that product is needed, meaning that retooling time can be eliminated.

Figure 2:
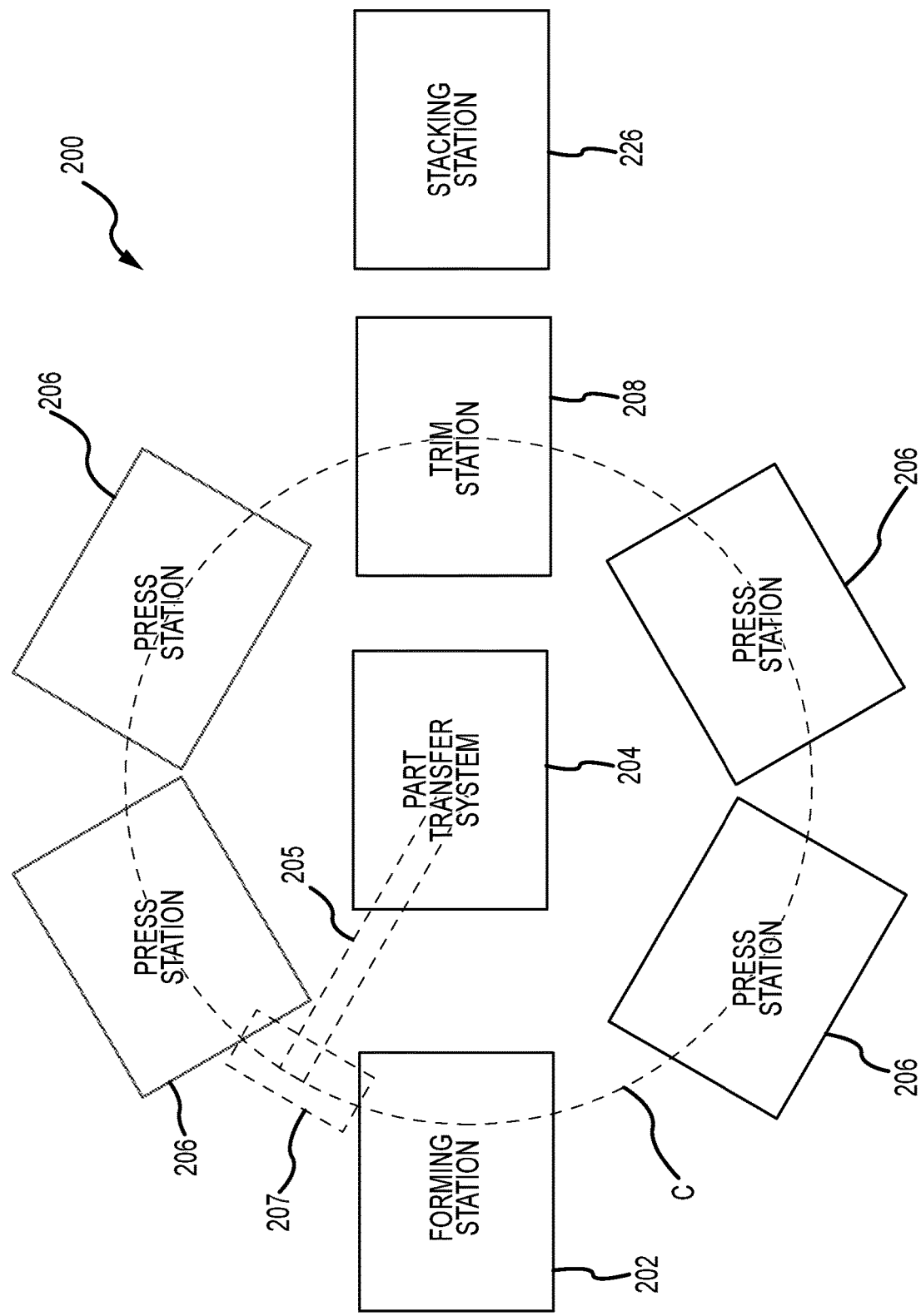
FIG. 2 depicts an example of the production line of FIG. 1, in a circular layout configuration.

FIG. 2 illustrates another embodiment of a production line 200. A number of components and features thereof are described above with regard to FIG. 1 and, as such, are not described further. In this production line 200, the various stations are disposed in a circular configuration about a central part transfer system 204. Here, the part transfer system 204 includes an articulating robotic arm 205 that has a maximum rotational range of motion generally corresponding to the depicted circle C. The part transfer system 204 moves a transfer feature 207 (in this case, a part transfer mold) disposed at an end of the robotic arm 205 from the forming station 202 to one of the four press stations 206. Movement in this example would generally include removing the transfer feature 207 from the forming station 202 (e.g., by retracting the robotic arm 205, rotating the robotic arm 205 so as to align the transfer feature with an access area (the area generally facing the part transfer feature 204) of a press station 206, then extending the robotic arm 205 so as to insert the transfer feature 207 into the press station 206. During this movement, the part transfer system 204 also moves the partially-formed fiber parts disposed on the part transfer feature 207. Once the formed fiber parts are pressed, the part transfer system 204 moves those parts (again disposed on the transfer feature 207) from the press station 206 to the trim station 208, in a generally similar movement pattern. In this example, then, the part transfer system 204 also acts as the removal system, as described above in the context of FIG. 1). Subsequent to a trimming operation at the trim station, the formed fiber parts may be transferred to one or more downstream stations, though only a stacking station 226 is depicted. A different transfer system from the trim station 208 to the stacking station 226 may be required. For example, the stacking system 226 may include dedicated arms or other features that remove the formed fiber parts from the trim station 208 and stack them directly at the stacking station 226. In another example, formed fiber parts may be moved from the trim station 208 to the stacking station 226 by one or more of a conveyor, a second robotic arm, a servo shuttle, or a ramp.

Figure 3:
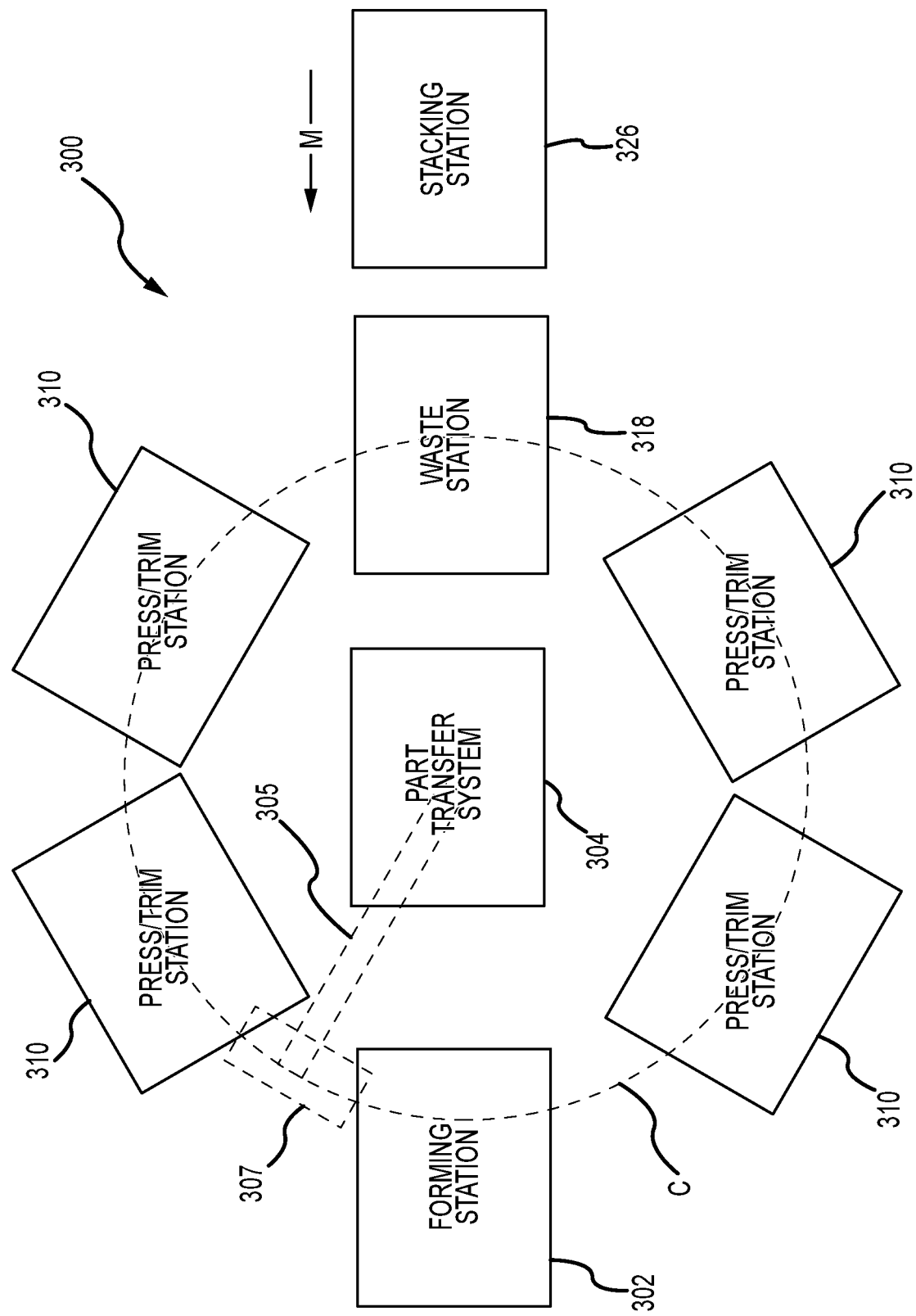
FIG. 3 depicts another example of the production line of FIG. 1, in a circular layout configuration.

FIG. 3 illustrates another embodiment of a production line 300. A number of components and features thereof are described above with regard to FIG. 1 and, as such, are not described further. In this production line 300, the various stations are disposed in a circular configuration about a central part transfer system 304. The part transfer system 304 includes a robotic arm 305 that has a rotational range of motion generally corresponding to the depicted circle C. The part transfer system 304 moves a transfer feature 307 (in this case, a part transfer mold) disposed at an end of the robotic arm 305 from the forming station 302 to one of the four combination press/trim stations 310. Part transfer feature 207 movement, as well as the parts disposed thereon) would be performed by the part transfer system 304 generally as described above with regard to FIG. 2. During this movement, the part transfer system 304 also moves the partially-formed fiber parts disposed thereon. Once the formed fiber parts are pressed and trimmed, the part transfer system 304 moves those parts (again disposed on the transfer feature 307) from the press station 306 to the waste station 318, where the trim is discarded. In that regard, the part transfer system 304 also acts as the removal system, as described above in the context of FIG. 1). Subsequent to the disposing operation at the waste station 318, the remaining formed fiber parts may be transferred to one or more downstream stations. In this example, the stacking station 326 may move M so as to align with the transfer feature 307, which deposits only the formed fiber parts thereon, before the stacking station 326 returns to its original position. Other conveyance systems are contemplated, e.g., as described with regard to FIG. 2. Although the production lines depicted in FIGS. 2 and 3 displays improved cycle times due to the plurality of press stations (or combination press/trim stations), the single part transfer system dedicated to both transfer and removal functions may cause increases in production line cycle time. Additionally, each of the depicted production lines 200, 300 may be subject to complete shut down if the part transfer system 204, 304 is inoperable due to maintenance or replacement. As such, although the production lines 200, 300 in the circular configuration may be advantageous due to a small footprint and other functionalities, some disadvantages are present.

Figure 4:
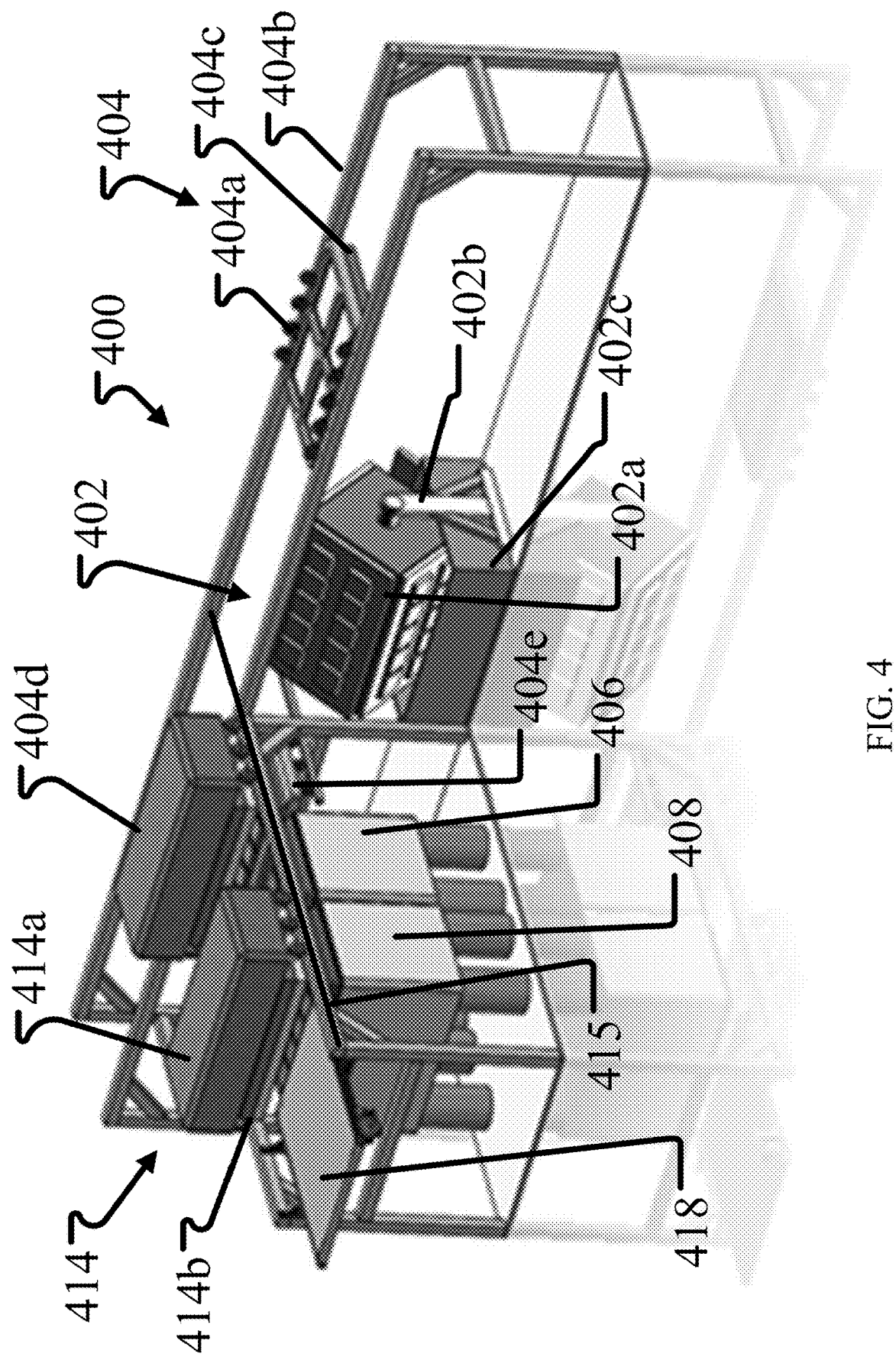
FIG. 4 depicts a partial perspective view of an example of the production line of FIG. 1, in a linear layout configuration.

FIG. 4 depicts a partial perspective view of an example of a production line 400, in a linear layout configuration. The production line 400 includes a forming station 402. The forming station 402 includes a forming mold 402a, and an actuation system 402b that lowers the forming mold 402a into a slurry tank 402c. A part transfer system 404 in the form of a shuttle 404a is mounted on a linear gantry or frame 404b located above the forming station 402. The shuttle gantry 404b may extend along a considerable distance or may be modularized so as to be expandable to support larger production lines. Further, the shuttle frame 404b extends linearly from either side of the forming station 402, allowing the forming station 402 to be centrally located within the production line 400. The shuttle 404a also includes a part transfer feature in the form of a part transfer mold 404c that may engage with the forming mold 402a to enable forming the partially-formed fiber parts, and transferring those parts to the press station 406. In this configuration, the part transfer system 404 also includes a press shuttle 404d that removes the parts from the shuttle 404a and deposits them at the press station 406. Multiple press stations 406 may be disposed along the shuttle gantry 404b, but only a single press station 406 is depicted in FIG. 4 for clarity. In this production line 400, the shuttle 404a moves along the shuttle gantry 404b from a location above and proximate the forming station 402 and receives from the forming station 402 a partially-formed fiber part (again, typically, multiple partially-formed fiber parts). The shuttle 404a then moves until it is adjacent the pressing station 406, where the partially-formed fiber parts are transferred to the press shuttle 404d, which then delivers the partially-formed fiber parts to the press 406.

Additional shuttles may be utilized as required or desired for a particular production line to transfer the partially-formed fiber parts. In one example, the central shuttle 404a simply moves back and forth on the central shuttle gantry 404b between the forming station 402 and the pressing station 406. When aligned with the pressing station 406, the central shuttle 404a releases its payload of molded products to a transfer shuttle 404e. The transfer shuttle 404e moves the partially-molded fiber parts to the press shuttle 404d, which carries the partially-molded fiber parts to the press station 406. These multiple shuttles 404a, 404d, and 404e maintain orientation of the partially-molded fiber parts.

The press station 406 is depicted schematically for clarity. After a pressing operation performed at the press station 406, the formed fiber parts are left in place on the press station 406. A removal system 414 in the form of a removal shuttle 414a with a removal feature 414b (a removal mold) transfers the formed fiber parts to a trim station 408, depicted schematically for clarity. In examples, a combination press/trim station may also be utilized. After a trim operation is performed, the removal system 414 removes the formed fiber parts and the trim, then deposits the trim at a waste station 418. In this configuration, the removal shuttle 414a may move beyond the waste station 418 to other downstream stations, not depicted. In the depicted configuration, the press shuttle 404d and the removal shuttle 414a are movable along the same gantry 415, though this is not required. The various gantries 404b, 415 depicted may include both upper and lower frame rails to surround casters or wheels upon which the shuttles 404a, 404d, 414a roll during movement. Other frame configurations are also contemplated. Further, unlike the systems that utilize rotating robotic arms as described herein, the linear movements of the various shuttles are easier to program, trouble shoot, and maintain, and likely involve lower initial capital investment.

Figure 4A:
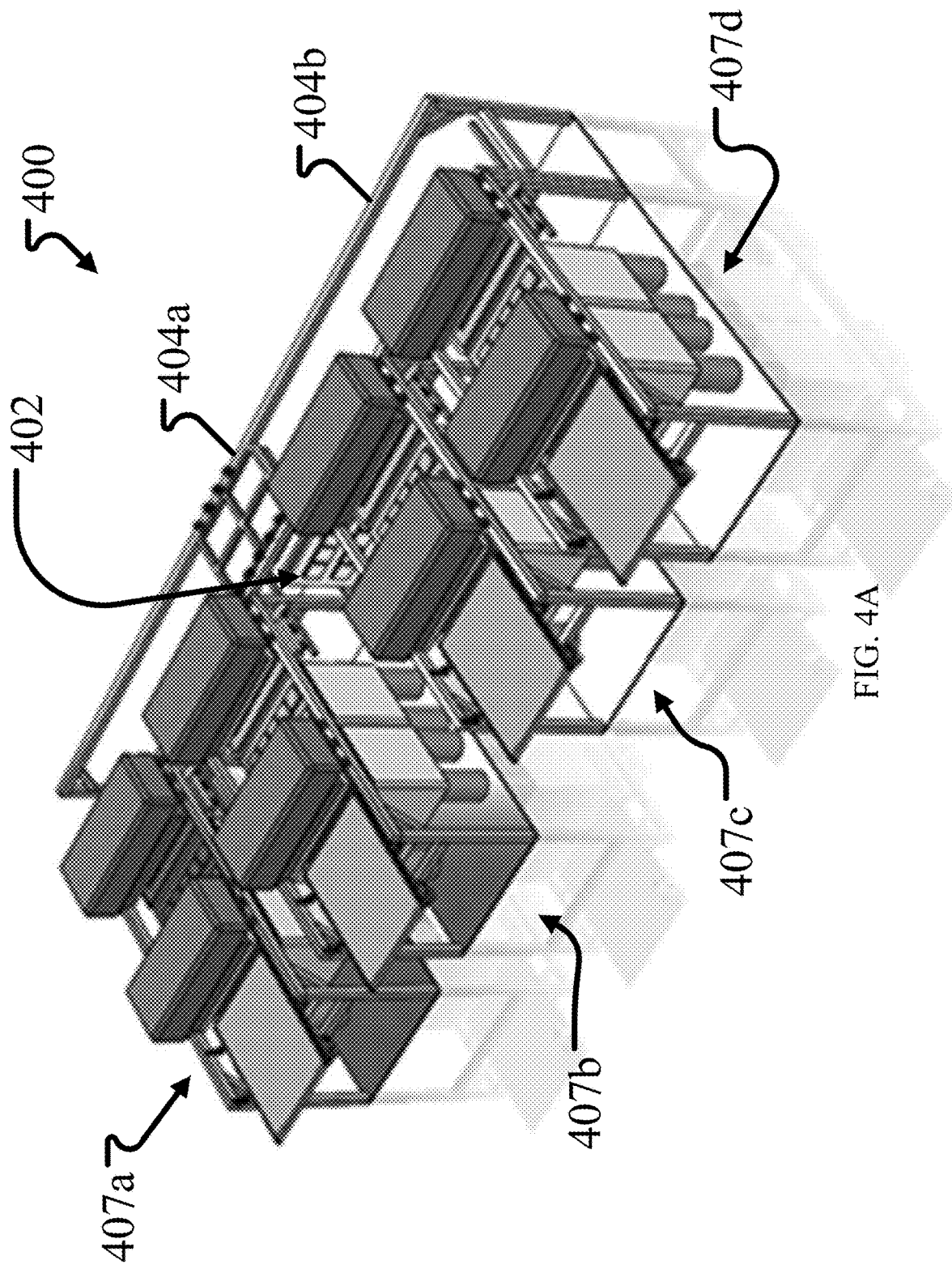
FIG. 4A depicts a partial perspective view of the production line of FIG. 4, with multiple parallel press and trim sublines.

FIG. 4A depicts a partial perspective view of the production line 400 of FIG. 4, with multiple parallel press and trim sublines 407a-d. A single former 402 serves the four sublines 407a-d, each of which are also served by a single central shuttle 404a that travels along a single gantry 404b. Each of the four two-stage pressing station may be configured as depicted in FIG. 4, above. In other examples, the length of the frame 404b may be extended so as to accommodate more than the four sub-lines 407a-d. Further, one or more sub-lines 407a-d may be disposed on an opposite side of the gantry 404b from where the four sublines 407a-d are depicted. Other systems and components of the production line 400 are depicted above in FIG. 4, or with regard to FIG. 1.

Figure 5:
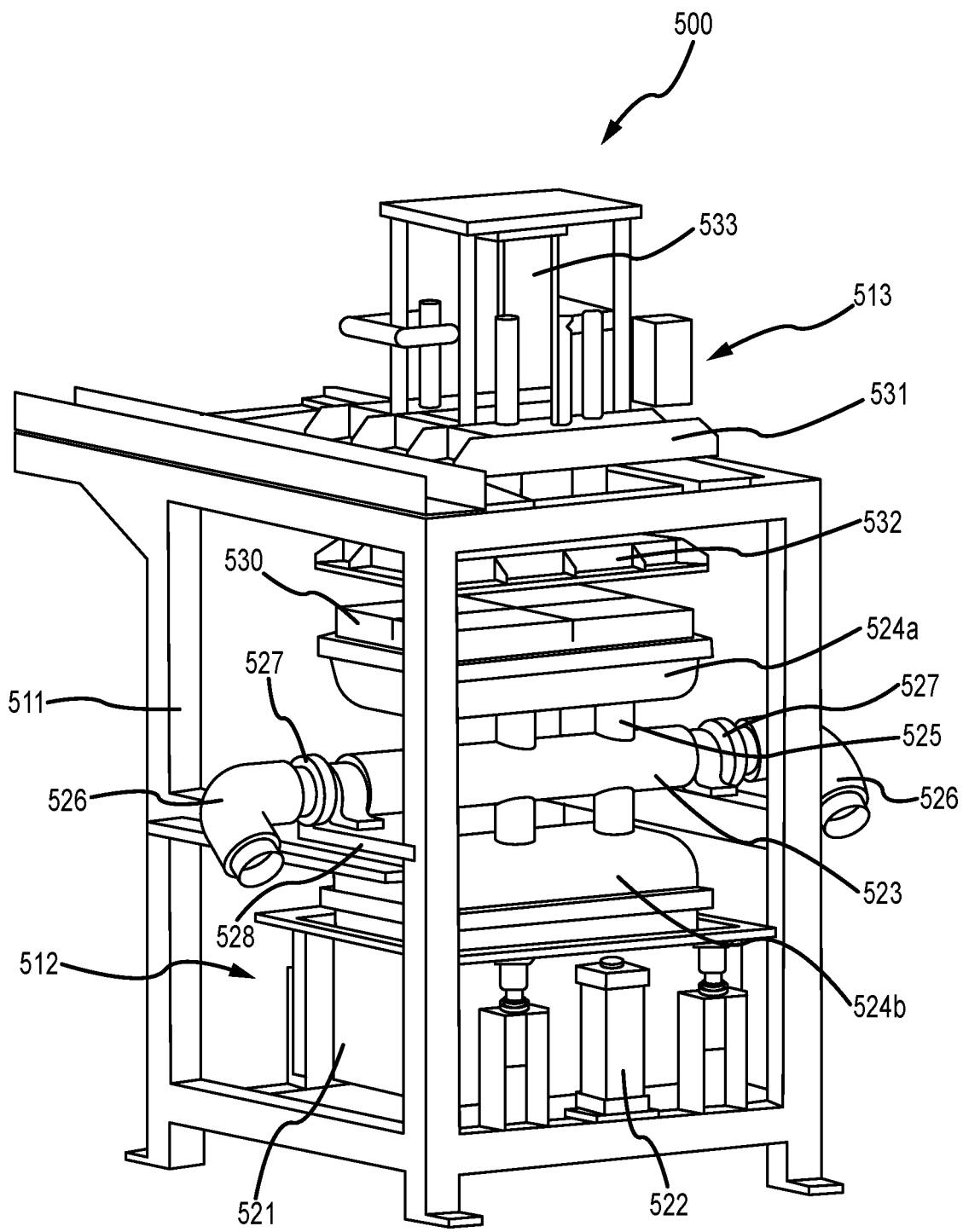
FIG. 5 depicts an example of a forming station.

FIG. 5 depicts an example of a forming station 500. Specifically, as shown in FIG. 5, the forming station 500 includes a frame 511 on which a lower portion 512 and an upper portion 513 are provided. The upper portion 513 includes a shuttle 531 (corresponding in this case to the part transfer system described above) having an actuation mechanism 533 that allows for raising and lowering of a transfer feature, in this case, a transfer mold 532. A dedicated vacuum source fixed to the shuttle 531 is not visible in the figure. A cylindrical rotating shaft 523 is rotatably connected to the middle of the frame 511 between the lower portion 512 and the upper portion 513 via a rack mount 528. The shaft 523 has a rotation angle of less than 360° and the cylindrical rotating shaft 523 rotates back and forth. At both ends of the cylindrical rotating shaft 523 is an elbow 526. The two ends of the rotating shaft 523 are fixed on the frame by the rotating shaft seat, and the gears 527 are respectively sleeved on both ends of the cylindrical rotating shaft 523, and the two sides of the middle portion of the frame 511 are provided with a translational connection with the gears 527. Attached to the cylindrical rotating shaft 523 are two opposing, symmetrical forming molds 524a, 524b. In this example, the two molds 524a, 524b include mold plates 530 (only visible on the upper portion 513) having core molds formed thereon and provided with screens onto which the fiber is drawn when the molds are in the lower forming chamber 521, or slurry tank. In FIG. 5, the lower mold 524b is in the slurry tank 521, referred to as the forming position, and the oppositely located upper mold 524a is facing upwards towards the shuttle 531 and the transfer mold (a cavity mold) 532 carried thereon.

The two core molds 524a, 524b are rigidly connected to the rotating shaft 523 by several tubes 525. These tubes 525 and hollow shaft 523 are connected to a vacuum pump system. The tubes are further connected to the penetrations in the molds 524a, 524b. The vacuum pump system creates the pressure differential that pulls the slurry towards the mold 524, thus causing the fiber to build up on the screened surface of the mold. As mentioned above, the two core molds 524a, 524b are symmetrical. This allows them to be rotated about the axis of rotating shaft 523 by rotating the shaft 523, thus quickly moving the molds between the lower portion 512 and an upper portion 513. The fiber slurry bath is contained in the slurry tank 521. When a mold 524 is in that tank 521 as illustrated in FIG. 5, the fiber is deposited on the mold 524 as the slurry is drawn through the mold 524 by the vacuum pump system, thus creating the partially-formed fiber part (not shown) on the mold 524. In one example of the forming station 500, after the appropriate amount of fiber is drawn onto the mold 524 to the desired thickness, the slurry tank 521 is lowered from the mold 524 by an actuation system in the form of a vertical lift 522, freeing the mold 524 to be moved to the upper portion 513 position. The mold 524 and partially-formed fiber part can then be rotated to the upper portion 513 position. The upper portion 513 includes transfer mold 532 attached to the actuation mechanism 533. Activating the mechanism 533 causes the transfer mold 532 to press against the upward-facing lower mold 524a. The mechanism 533 may include one or more of a hydraulic cylinder, a servomotor, a gas cylinder or any other known lifting device. By pressing the mold 524 and mold 532 together, water may be driven out of the partially-formed fiber part and collected through the inner mold 524 via the shaft 523. Upon completion of the pressing operation, a suction is applied to the partially-formed fiber part through penetrations in the mold 532, and the mold 532 is retracted by the mechanism 533 onto the shuttle 531 for movement to a downstream station. This frees the mold 524 to be rotated to the lower portion 512 for the entire forming process to be repeated.

In an example, the press operation performed by the transfer mold 532 is operated at a selected pressure for a fixed period of time that is equal to the time that is taken for the formed part to be drawn onto the mold at the lower portion 512. In an alternative embodiment described in greater detail below, the pressing time is dynamically controlled based on monitoring data from sensors at one or more locations on the upper portion 513. In an alternate example of the forming station 500, the slurry tank 521 may also include a movable outer mold (not shown) in the tank 521. In this embodiment, after the fibers from the slurry are drawn onto the mold 524, this outer mold may be pressed against the mold 524 while in the slurry tank 521. This provides an additional pressing operation to the partially-formed fiber part, so that the parts exiting the former 500 will have been subjected to two pressing operations instead of just one as with the previous example. Regardless, after the partially-formed fiber part is created and removed from the inner mold 524 by the transfer mold 532, the shuttle 531 transfers it to another station in production line. In another example, the transfer mold 532 may be located at the end of a robotic arm that extends into the upper portion 513 and receives the part when the transfer mold's 532 suction on the partially-formed fiber part is activated. This is but one example of how the transfer of parts via the robotic arm may be effected. Many such methods and systems are known in the art and any suitable method and mechanism may be used in the forming station 500, the robotic arm or any other component of the production lines described herein.

Figure 6:
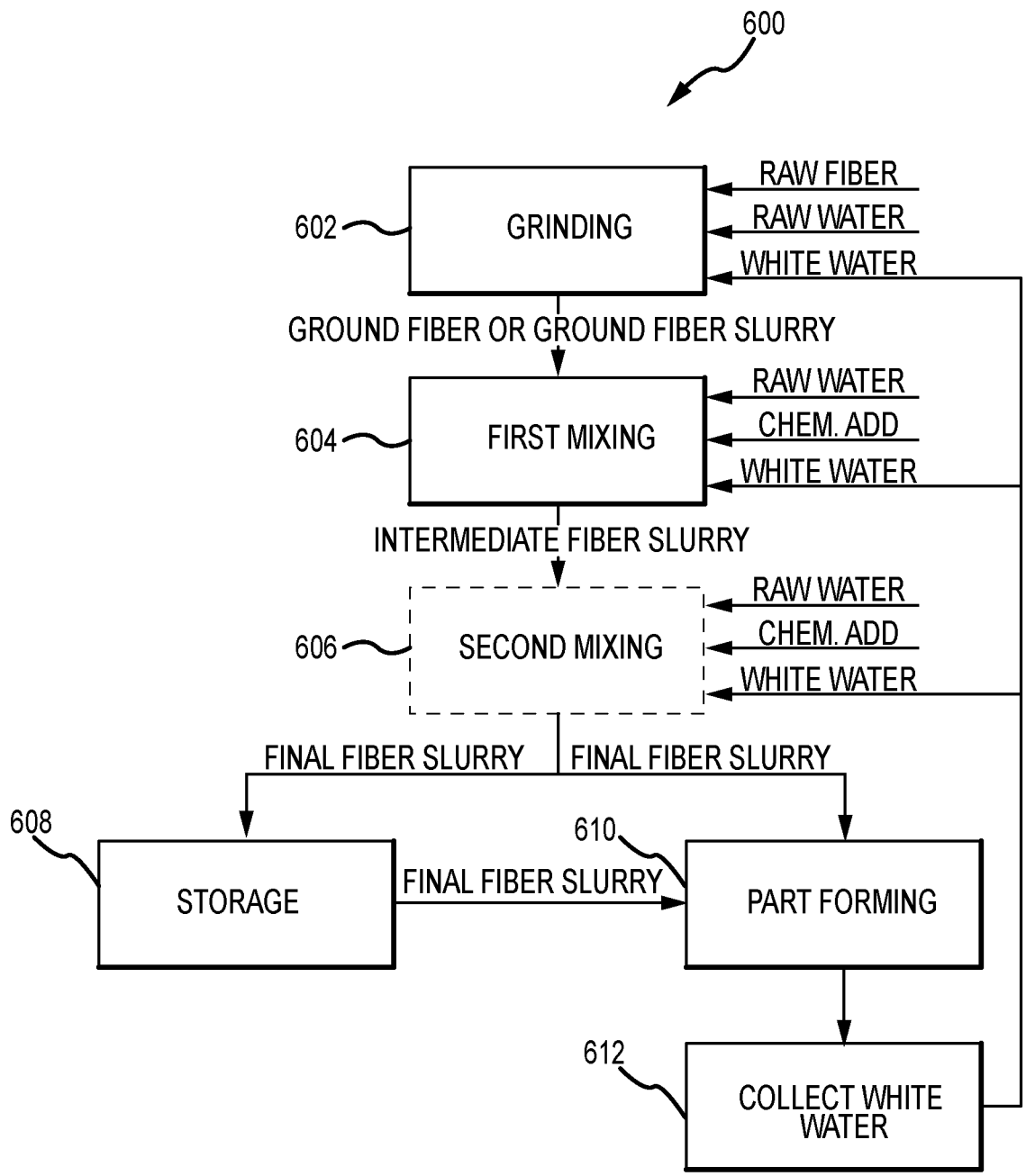
FIG. 6 illustrates an embodiment of a method for fiber slurry production.

FIG. 6 illustrates an example of a method for fiber slurry production. Sometimes referred to as "wet prep" or "stock prep", the slurry production line 600 creates the fiber slurry from the raw materials. Typical raw materials are: wood or plant fiber, typically provided in rolls or sheets; and water. In some instances chemical additives may also be used to enhance or modify characteristics of the final fiber product (e.g., resistance to grease penetration, water adsorption rate, porosity, density, etc.). In the example shown, incoming raw dry fiber is passed to a grinder and shredded to a predetermined size in a grinding operation 602. Sometimes also referred to as a pulper or hydropulper, the grinder may be any conventional grinder. Fiber grinding is known in the art and any conventional system or method, now known or later developed could be used. In an example, the fiber is mixed with at least some water as part of the grinding operation 602 and the output product is a liquid stream containing a mixture of ground fiber and water. This improves the grinding efficiency and reduces the generation of fiber dust from the operation.

In an example, the grinding may be done in multiple stages. For example, a first grinder may perform a coarse grind and pass the coarsely ground fiber slurry to a second, fine grinder that generates the final grind and outputs the ground fiber slurry. After the grinding, the ground fiber and water mixture is passed to a first mix tank where a first mixing operation 604 is performed. In the first mixing operation 604, additional water is added, if needed. If the final fiber part to be created needs specific characteristics, chemical additives also may be added in the first mixing operation 604. As part of the first mixing operation 604, the quality of the slurry may be monitored, periodically or continuously. The addition of water, any additives, and temperature may be controlled in response to the information obtained from the monitoring. In an example, the monitoring may include use of one or more sensors such as temperature sensors, water quality sensors such as hydrometers, total dissolved solids (TDS) sensors, pH meters, densimeters, dissolved oxygen sensors, salinity meters, resistivity meters, conductivity meters, etc. Many water quality sensors are known in the art and any such monitoring device, now known or later developed may be used to monitor the quality of the slurry in this, or any operation in the slurry production method 600.

After the first mixing operation 604, an optional second mixing operation 606 may be performed. In this example, the first mixing operation 604 may be considered a pre-mixing or preparation operation that is controlled to get the slurry to within a certain range of slurry quality. The second mixing operation 606 is then used to adjust the slurry characteristics to a finer quality range. For example, in the first mixing operation 604 the slurry may be controlled to +/−10% of a desired nominal slurry quality (e.g., if the desired slurry is a 10% by weight fiber slurry, then the fix mix tank is controlled to maintain the slurry within 9.0 to 11.0% by weight fiber. The second mixing operation 606 may then be designed to maintain the slurry within a +/−1% of nominal range). The +/−10% and +/−1% ranges of the two operations 604, 606 are simply examples and any suitable ranges may be used. For example, the first mixing operation 604 may maintain the slurry at +/−0.5% of nominal, +/−1.0%, +/−1.5%, +/−2.0%, +/−2.5%, +/−3.0%, +/−3.5%, +/−4%, +/−4.5%, +/−5.0%, +/−7.5%, +/−10.0%, +/−15.0%, +/−20.0% and the second mixing operation 606 may maintain the slurry at any smaller range around the nominal, such as, +/−0.01%, +/−0.05%, +/−0.1%, +/−0.2%, +/−0.25%, +/−0.30%, +/−0.035%, +/−0.4%, +/−0.45%, +/−0.5%, +/−0.55%, +/−0.6%, +/−0.75%, +/−1.0%, +/−2.0%, +/−5.0%, or greater.

In an example of the second mixing operation 606, the intermediate slurry from the first mixing operation 604 is analyzed and a stream is passed through an intermediate mixer where the addition of water and chemical additives, if any, is finely controlled to achieve a slurry quality within the finer range. The intermediate mixer may be a mixing tank or a plug flow reactor or a combination thereof. The second mixing operation 606 may be a batch, semi-batch or continuous operation. The second mixing operation 606 outputs a stream of final fiber slurry that may then be stored in a storage tank in a storage operation 608 until use or passed directly to the forming station for use as described above in creating a formed part in a forming operation 610. As part of the forming operation 610 water is reclaimed from the slurry as the slurry is passed through the mesh on the forming mold. The reclaimed water is referred to as "white water". This white water may be reused in the slurry production method 600 by collecting the white water in a collection operation 612. The white water may then be returned and used as feed water in any of the grinding operation 602, first mixing operation 604 and/or second mixing operation 606.

In an example, the water used in the fiber slurry production method 600 is pretreated to remove any unwanted organic or inorganic compounds. For example, in an example the water may be filtered to reduce salt or total dissolved solids (TDS) concentration. The closed loop formed by the collection operation 612 and returning white water to the slurry as feed water is especially economical if the raw water must undergo pretreatment before use in the slurry production method 600. In an example, the water and various intermediate and final slurries created in the fiber slurry production method 600 are heated to maintain them at a desired temperature. In an alternate example, the final fiber slurry is heated as a last operation (not shown) prior to being transferred to the forming station. For example, in an example the ground fiber slurry, the intermediate fiber slurry and the final fiber slurry are all maintained within a predetermined temperature range. That is, the temperature of the water and slurry throughout the production process are temperature controlled. The temperature range may be from 90° F. and 200° F. or from 100° F. and 150° F. In one example, the predetermined temperature range is +/−5° F. around a nominal temperature selected from 90° F., 95° F., 100° F., 105° F., 110° F., 115° F., 120° F., 125° F., 130° F., 135° F., and 140° F.

Figure 7:
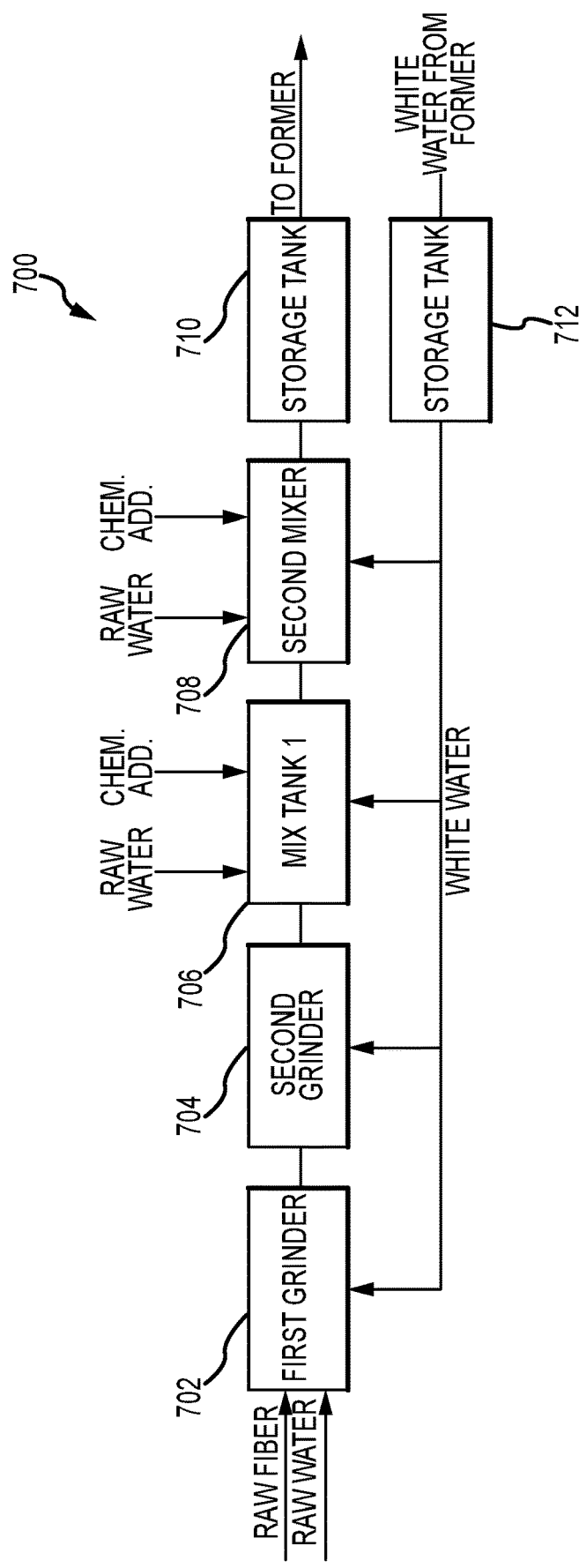
FIG. 7 is a schematic of a slurry production line that performs the method of FIG. 6.

FIG. 7 is a schematic of a slurry production line 700 that performs the method of FIG. 6. In the schematic, a first grinder 702 and a second grinder 704 are followed by a first mix tank 706. The grinders 702, 704 are described above. The first mix tank 706 may be open or closed, exposed to the atmosphere or atmosphere controlled. The slurry may be agitated while in the mix tank 706. Any means of agitation may be used such as a mechanical agitator (e.g., bladed stirrer, paddle, or rotating screw), removing and reinjecting slurry to circulate the contents of the tank, or by sparging a gas (e.g., heated or ambient temperature air, nitrogen, argon, or other inert gas) through the slurry in the tank. The tank 706 may be temperature controlled by any suitable means as are known in the art (e.g., heated jacket, internal heating element, heated slipstream, infrared radiation, etc.). Temperature sensors may be provided to continuously monitor the temperature of the tank 706.

A second mixer 708 is provided that performs the second mixing operation 606. As discussed above, the second mixer 708 need not be a tank and could be a plug flow reactor (e.g., a section of pipe with injection points for water and chemical additives and sensors to monitor the quality of the slurry). Or it could be a second mix tank 708 similar to the first mix tank 706. A storage tank 710 is provided in the slurry production line 700 for buffering final fiber slurry before transferring it to the forming station (depicted elsewhere herein). The slurry production line 700 also includes the white water return from the forming station, as shown. A second storage tank 712 is provided for buffering white water until the water is needed in the earlier operations of the slurry production line 700. In an example, the slurry production line 700 forms a closed loop requiring little or no makeup water after initial startup.

The schematic of FIG. 7 does not include the standard plumbing fixtures and appliances normally attendant in such an operation, such as flow control valves between each component, relief valves, bypass valves, sampling ports, pumps where necessary to move slurry between components, a conveyor or similar feeder for delivering raw fiber to the grinder, sensors, and the like. The reader will understand that such fixtures and appliances are anticipated and considered part of the production line 700 but, for clarity, are not represented in FIG. 7. For example, in an example there is a pump between each component in the production line 700.

The slurry production line 700 may be configured for batch, semi-batch or continuous operation. In continuous operation, one or more components may store sufficient fiber slurry to act as a flow buffer to allow for switching out of fiber sources or periodic (automated or manual) fiber grinding operations. For example, in an example, the first mixing tank 704 is sized to hold a sufficient volume of slurry for eight hours of continuous operation of the fiber product production line 700 at full operation. In this way, ever few hours a new batch of ground fiber slurry may be generated (either automatically or manually) and added to the first mix tank 706. The second mix tank or mixer 708 may be significantly smaller or a simple pass through that continuously feeds final fiber slurry to the forming station. In an example, except for reloading raw fiber input materials and maintenance activities the slurry production line 700 may be fully automated and control from a central control system. In yet another example, even the raw fiber input handling is automated using autonomous robots for moving and installing the raw fiber input onto the feeding system (e.g., inserting new rolls of raw fiber sheet into a roll feeding apparatus or placing bales of fiber sheets in a feed hopper).

Figure 8:
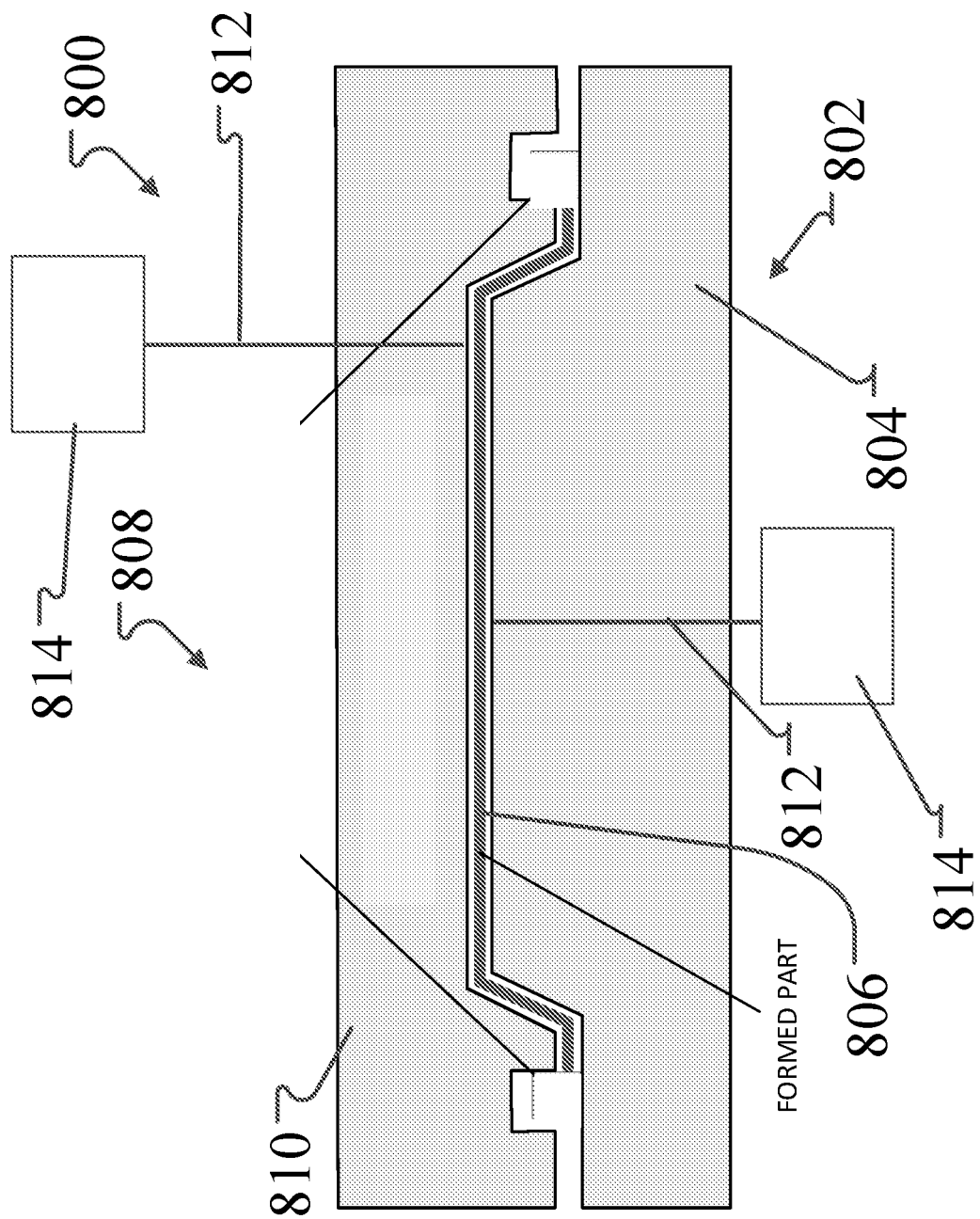
FIG. 8 depicts a partial schematic view of a forming station and part transfer system in mating engagement.

FIG. 8 depicts a partial schematic view of a forming station and part transfer system in mating engagement 800. The forming station 802 includes a forming mold 804, in this case in a core mold configuration. As used herein, the term "core mold" means a mold having features that substantially project away from the mold plate so as to form a "core" about which the fiber part 806 is at least partially surrounded. The part transfer system 808 includes a part transfer feature, in this case, in the form of a part transfer mold having a cavity mold configuration. As used herein, the term "cavity mold" means a mold having features that substantially project inward into the mold plate so as to form a "cavity" into which the fiber part 806 and core mold extend. Each of the forming mold 804 and the part transfer mold 810 define at least one (but usually a plurality) of vacuum channels 812. The vacuum channels 812 are each connected to a dedicated vacuum source 814, the function of which is described above. It should be noted that a similar mating engagement is utilized when a removal system (described above) engages with a mold of a press station.

Figure 9:
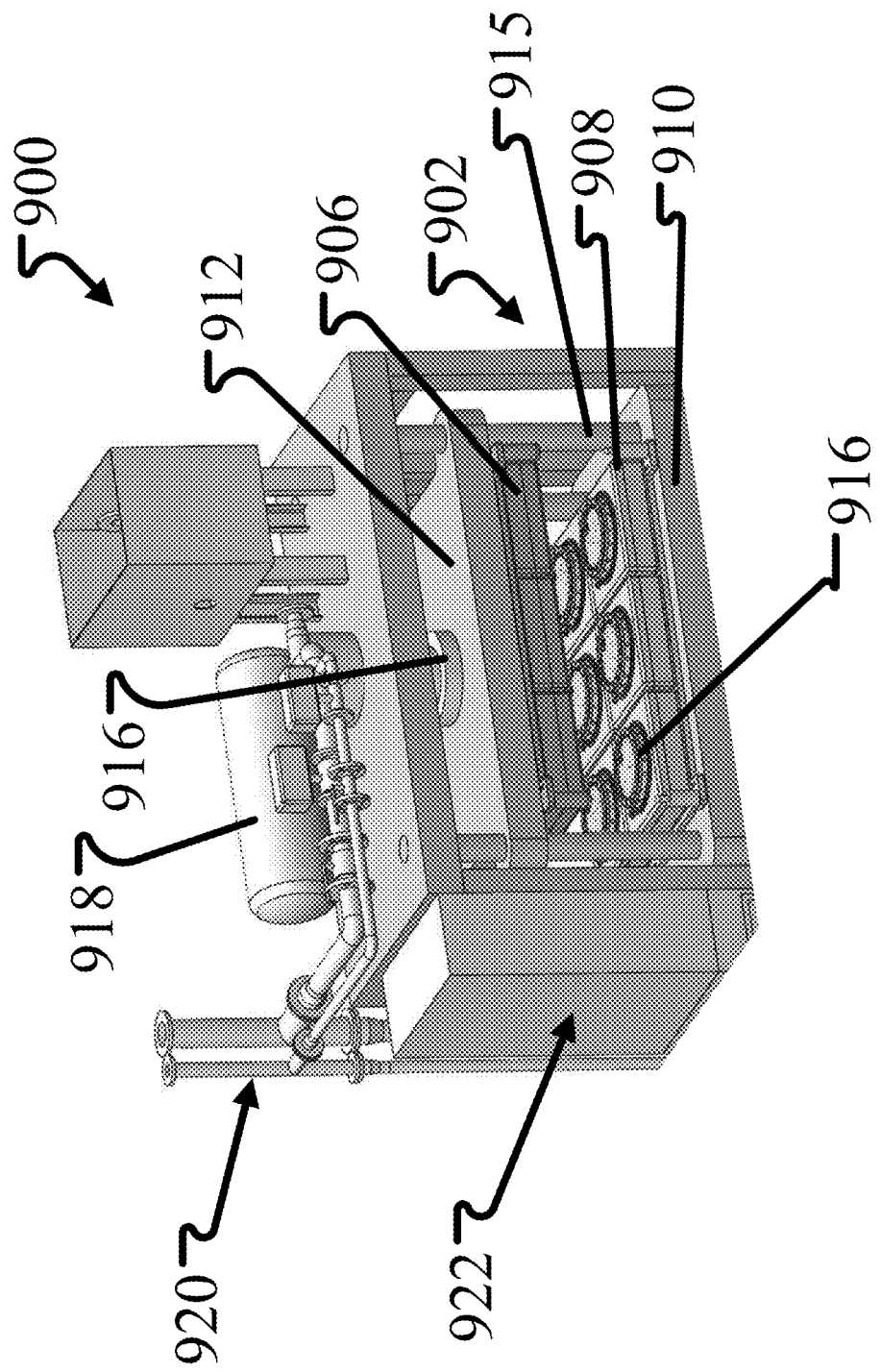
FIG. 9 depicts a perspective view of a press station.

FIG. 9 depicts a perspective view of a press station 900. The station 900 includes a press mechanism 902 that includes an upper mold 906 and a mating lower mold 908. The lower mold 908 in this case is referred to as a core mold because of the presence of projecting features 916 that form the forming core of the molded fiber part. The upper mold 906, in contrast, is referred to as a cavity mold because of a cavity formed therein to receive the projecting features 916 and the molded fiber part during press operations. In other examples, the location of the core and cavity molds may be reversed. The upper mold 906 and lower mold 908 may include one or more individual plates that are used to form the particular formed packaging product. In the depicted example, six plates each are used in the upper mold 906 and lower mold 908, although other numbers of molds are contemplated. By using multiple plates per mold, the throughput of the production line is increased. In this example, a press station 900 has six plates, although one, two, four, eight, ten, or more plates may be used. While odd numbers of plates may be used, even numbers of plates are more typical. This increases the throughput for a press station 900 (as well as other stations within the production line) within only an incremental increase in the cost of the equipment.

The press mechanism 902 is supported on a fixed base 910. The press mechanism 902 includes a movable plate 912, to which is secured to the upper mold 906. This movable plate 912 is configured to slide along a plurality of rails 915, when actuated by a piston 916. Actuation of the piston 916 drives the movable plate 912 (with the upper mold 906 located thereon) towards the base 910. A single pressurized fluid chamber 918 may be connected by pipes 920, valves, and other known elements to the piston 916. A controller 922 may be programmable and communicatively coupled to a controller for the robot (not shown) or shuttles that form a part of the production line (not shown) so as to control the station 900 as required or desired for a particular application. In applications, either or both of the upper mold 906 and lower mold 908 may be heated so as to properly form the molded fiber products. Such heating elements are described elsewhere within the present application.

Figure 10:
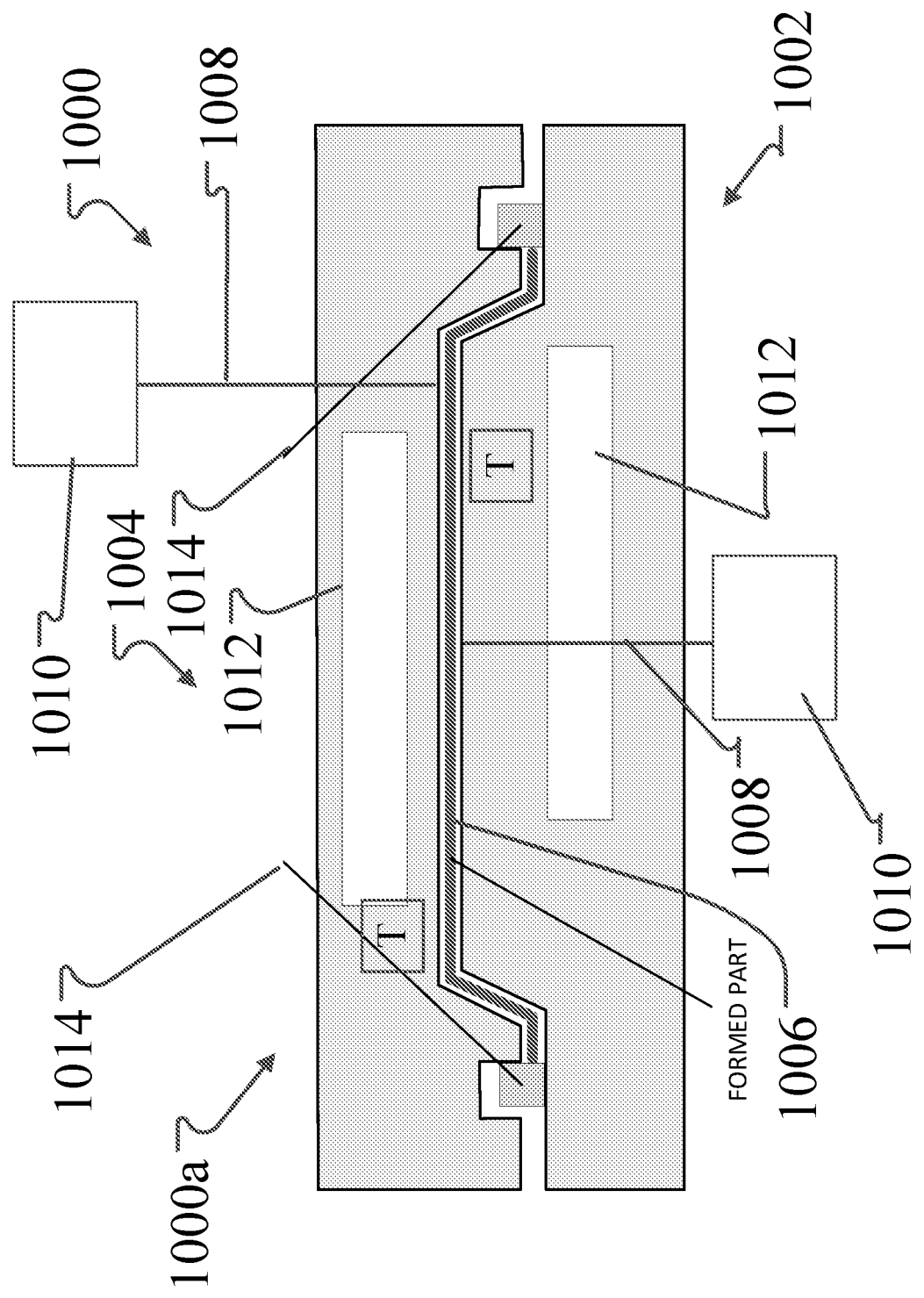
FIG. 10 depicts a partial schematic view of a two molds of a press station in mating engagement.

FIG. 10 depicts a partial schematic view of a two molds of a press station 1000 in mating engagement. The press station 1000 includes a lower mold 1002, in this case in a core mold configuration. An upper mold 1004 is in the form of a part transfer mold having a cavity configuration. The terms "core mold" and "cavity mold" are described above. A fiber part 1006 is disposed between the lower mold 1002 and the upper mold 1004. Each of the lower mold 1002 and the upper mold 1004 define at least one (but usually a plurality of) vacuum channels 1008. The vacuum channels 1008 are each connected to a dedicated vacuum source 1010, the function of which is described above. Each of the lower mold 1002 and the upper mold 1004 each include a heating element 1012. In the case of a dedicated press station 1000, the elements 1002-1012 are utilized. However, as noted elsewhere herein, a combination press/trim station 1000*a* may be utilized in certain examples of a production line. In a combination press-trim station 1000*a*, elements 1002-1012 are still utilized, but a trimmer 1014 may also be used in conjunction with either or both of the lower mold 1002 and the upper mold 1004. The trimmer 1014 may be a discrete element, as in the depicted example. As the lower mold 1002 and the lower mold 1004 are brought into compressive contact, the trimmer 1014 may cut or press through any material disposed outside of a predetermined portion of the molds 1002, 1004. This separates waste trim from the molded fiber part 1006.

Figure 11A:
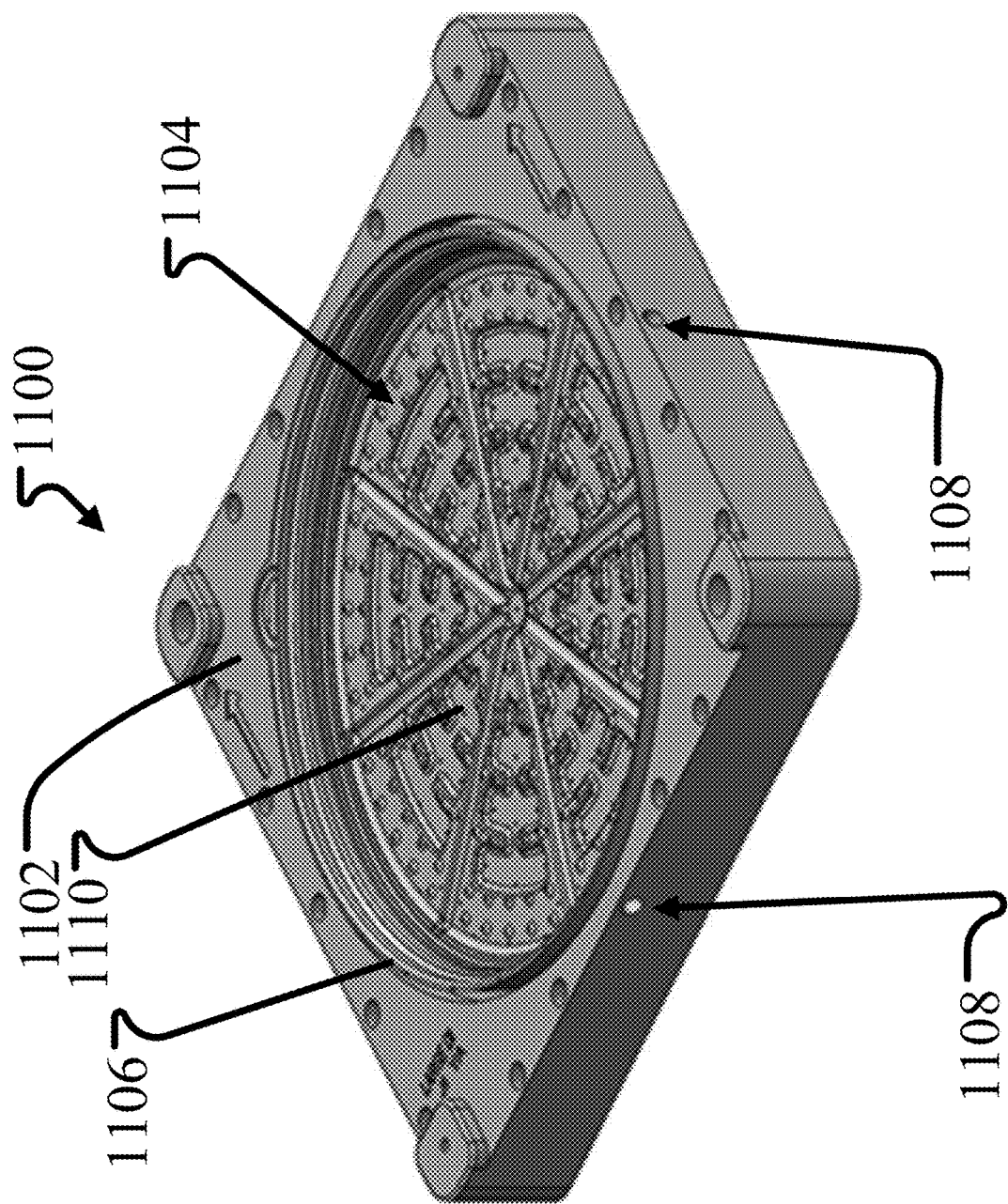
FIGS. 11A and 11B depict a perspective view and a partial enlarged perspective view, respectively, of an upper mold for a press station.

Improved control of temperature during the operation of the press station 1000 is anticipated to improve the quality of the formed fiber parts and increase yield of the production line. In one example, each mold 1002, 1004 is provided with an internal heating element 1012. The element 1012 may be a simple internal passage through which a heated fluid may flow. In an alternative example, a resistive heater may be built into each mold 1002, 1004. Heating elements 1012 are known in the art and any suitable heating technology, now known or later developed, may be used. Examples of a heated mold 1002, 1004 may be further provided with one or more temperature sensors T. The temperature sensors T may monitor the temperature in the mold 1002, 1004, of the surface of the mold 1002, 1004, of the fiber part 1006, or at any other location in, on, or near the mold 1002, 1004. Furthermore, for more fine control of temperature, a mold 1002, 1004 may be divided into multiple segments, or sectors, and the temperature of each segment may be independently monitored and controlled. For example, a circular mold, such as depicted in FIG. 11A, for a making a molded fiber part may be divided into two, four, or more, segments. Each segment may be provided with one or more temperature sensors and one or more internal heating elements. By monitoring and controlling each sector's temperature, it is believed the performance of the mold may be further improved.

Figure 11B:
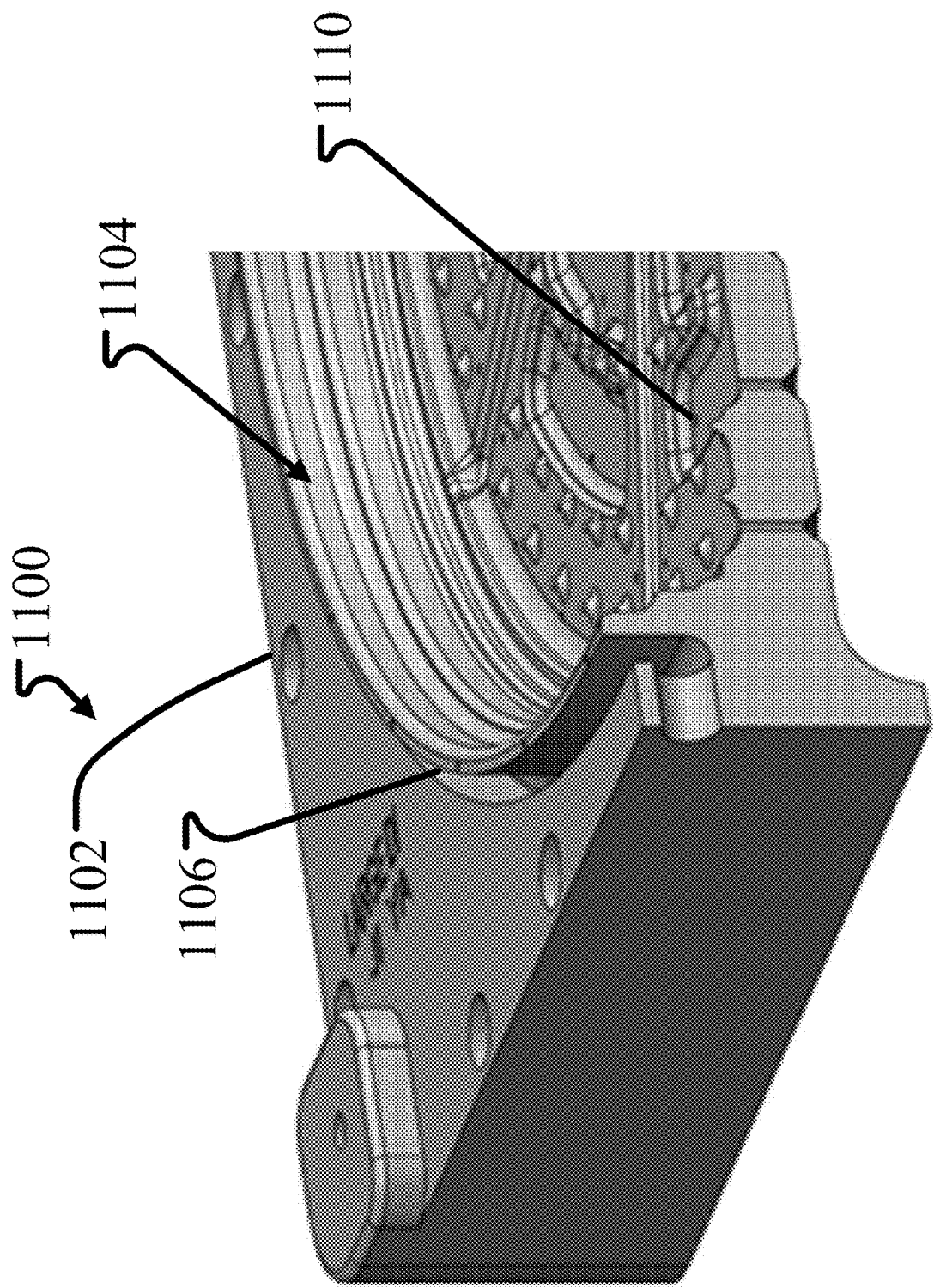

FIGS. 11A and 11B depict a perspective view and a partial enlarged perspective view, respectively, of an upper mold 1100 for a press station. FIGS. 11A and 11B are described concurrently and the mesh covering is not depicted for clarity. The upper forming mold 1100 (depicted inverted in FIGS. 11A and 11B) is formed from a machined unitary part 1102. The unitary part 1102 has formed therein a cavity mold 1104 that, in the depicted example, includes an integral trimmer 1106 that defines an outermost extent of a molded fiber product (not shown) formed with the mold 1100. In other examples, the integral trimmer may be formed as part of a lower mold, described above. As described above, one or more vacuum channels formed in the part 1102 may be communicatively coupled to ports 1110 on the surface of the cavity 1104 to draw liquid, under vacuum, from the partially-formed fiber part during pressing operations.

Figure 12:
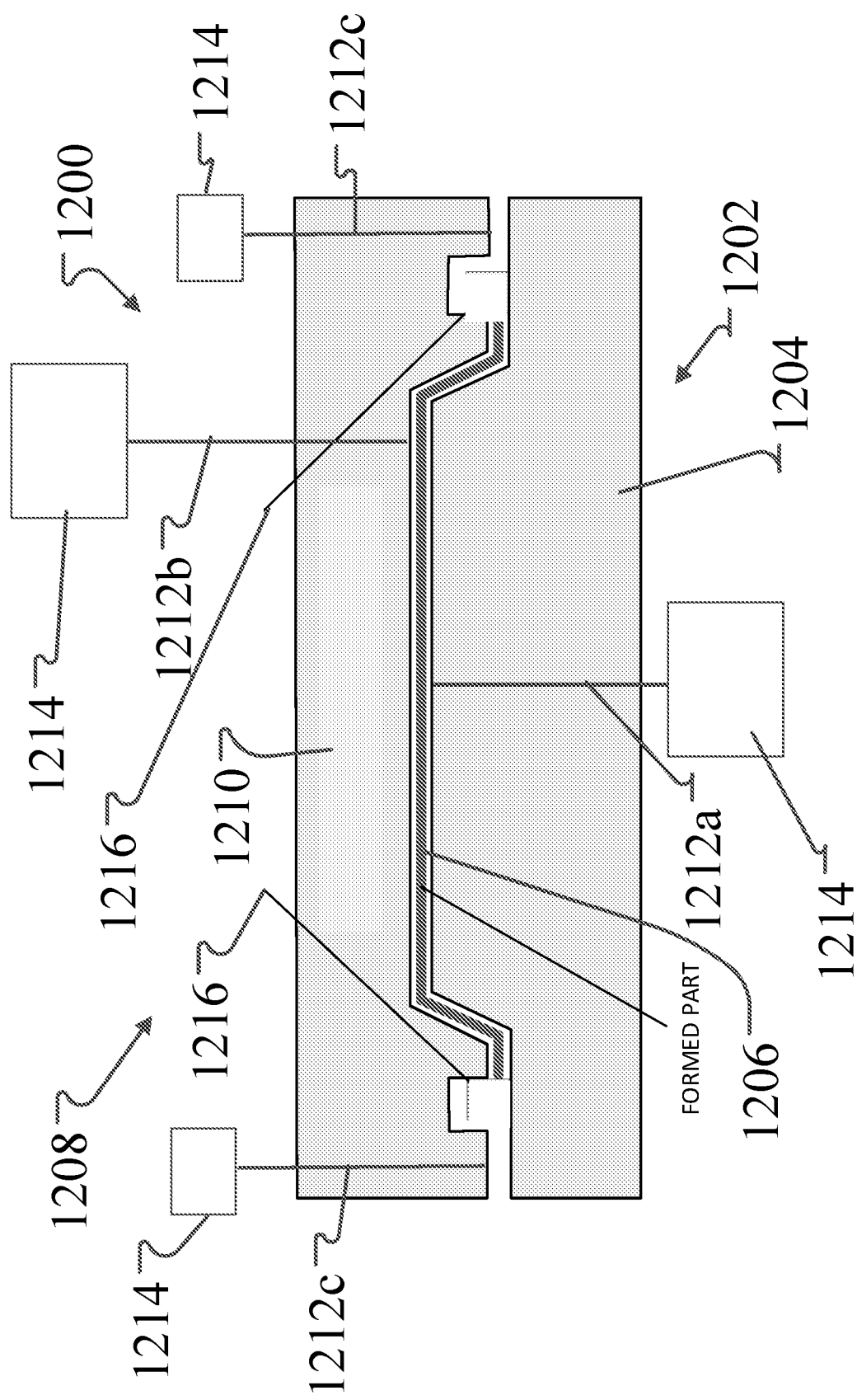
FIG. 12 depicts a partial schematic view of a press/trim station mold and a removal system in mating engagement.

FIG. 12 depicts a partial schematic view of a press/trim station 1202 and a removal system 1208 in mating engagement 1200. The press/trim station 1202 includes a lower mold 1204, in this case in a core mold configuration. The removal system 1208 includes a removal feature, in this case, in the form of a removal mold 1210 having a cavity mold configuration into which a fiber part 1206 and core mold extend. Each of the lower mold 1204 and the part transfer mold 1210 define at least one (but usually a plurality) of vacuum channels 1212. The vacuum channels 1212 are each connected to a dedicated vacuum source 1214, the function of which is described herein. Vacuum channel 1212*a* is described above in the context of FIGS. 10-11B. Vacuum channel 1212*b* operates to remove the formed fiber part 1206 from the press station 1202. Similarly, vacuum channel 1212*c* operates to remove trim cut during the press/trim operation. As such, the ports connected to vacuum channel 1212*c* are disposed outside of the position 1216 where the trimmer would be located.

Figure 13:
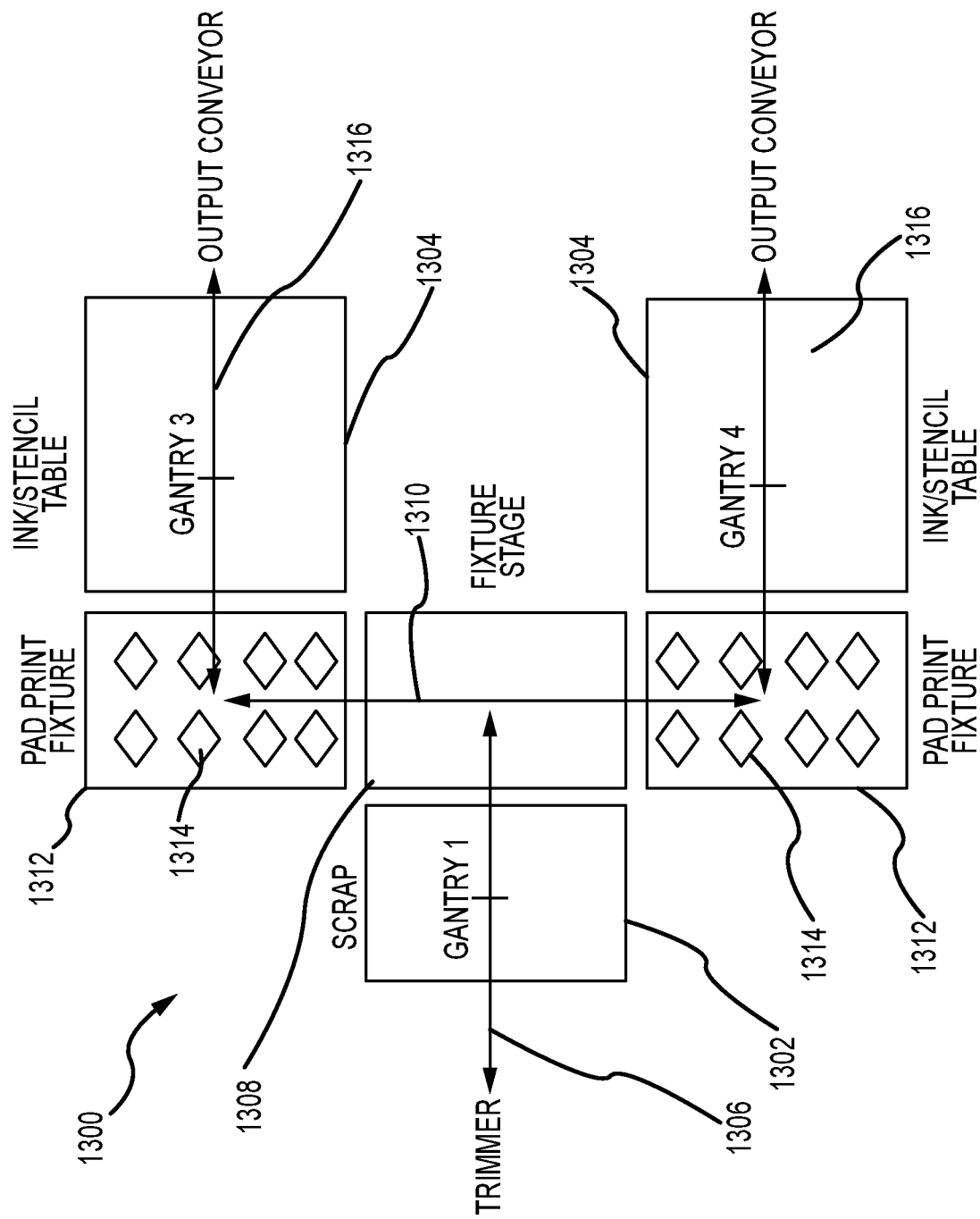
FIG. 13 depicts a partial schematic view of downstream stations of a production line, specifically, waste and print stations.

FIG. 13 depicts a partial schematic view of downstream stations 1300 of a production line, specifically, a waste station 1302 and a plurality of print stations 1304. The depicted downstream stations 1300 of the production line are shown in conjunction with a first shuttle 1306, which may be the removal system described above. In other examples, a removal system utilizing a robotic arm, instead of a shuttle, may be used. The first shuttle 1306 removes formed fiber parts and trim from the trim station or the combination press/trim station. When disposed at the waste station 1302, the trim vacuum associated with the first shuttle 1306 deactivates so as to drop the trim at the waste station 1302. From there, the trim may be re-introduced back into the slurry system. The first shuttle 1306 deposits the formed fiber parts at an entry location of the print station, a fixture stage 1308, where they are then picked up by a second shuttle 1310 that moves in a direction substantially orthogonal to the first shuttle 1306, to one of two printing stations 1304. In an alternative example, a single print station aligned with the first shuttle 1306 may be utilized. The second shuttle 1310 transfers the formed fiber parts to a pad print fixture 1312. The pad print fixture 1312 may include one or more registration features 1314 to maintain proper positioning of the molded fiber part(s) during subsequent printing. The registration feature may be a core mold, a cavity mold, or a simplified contoured or raised feature(s). The registration features 1314 may be formed on an output conveyor 1316 that moves the registration features 1314 and molded fiber parts disposed thereon to the print station 1304. The print station 1304 may utilize a pad printer, a stencil printer, or screen printer. In other examples, the print station 1304 may include an ink printer, laser printer, UV printer, an embosser, a labeler, and/or any type of tool adapted to color or mark parts. For example, in an example the print station 1304 prints a corporate logo on parts in biodegradable ink. In another example, the print station 1304 may print or label parts with instructions such as cooking instructions, opening instruction or assembly instructions. The print station 1304 may also be located at alternative points in the production line, e.g., between the press station and the trim station. In an alternative example, the printing operation may be performed at the pad print feature 1312, while the element depicted at reference numeral 1304 may be an inking location for a movable printer (e.g., a rubber pad printer).

Figure 14:
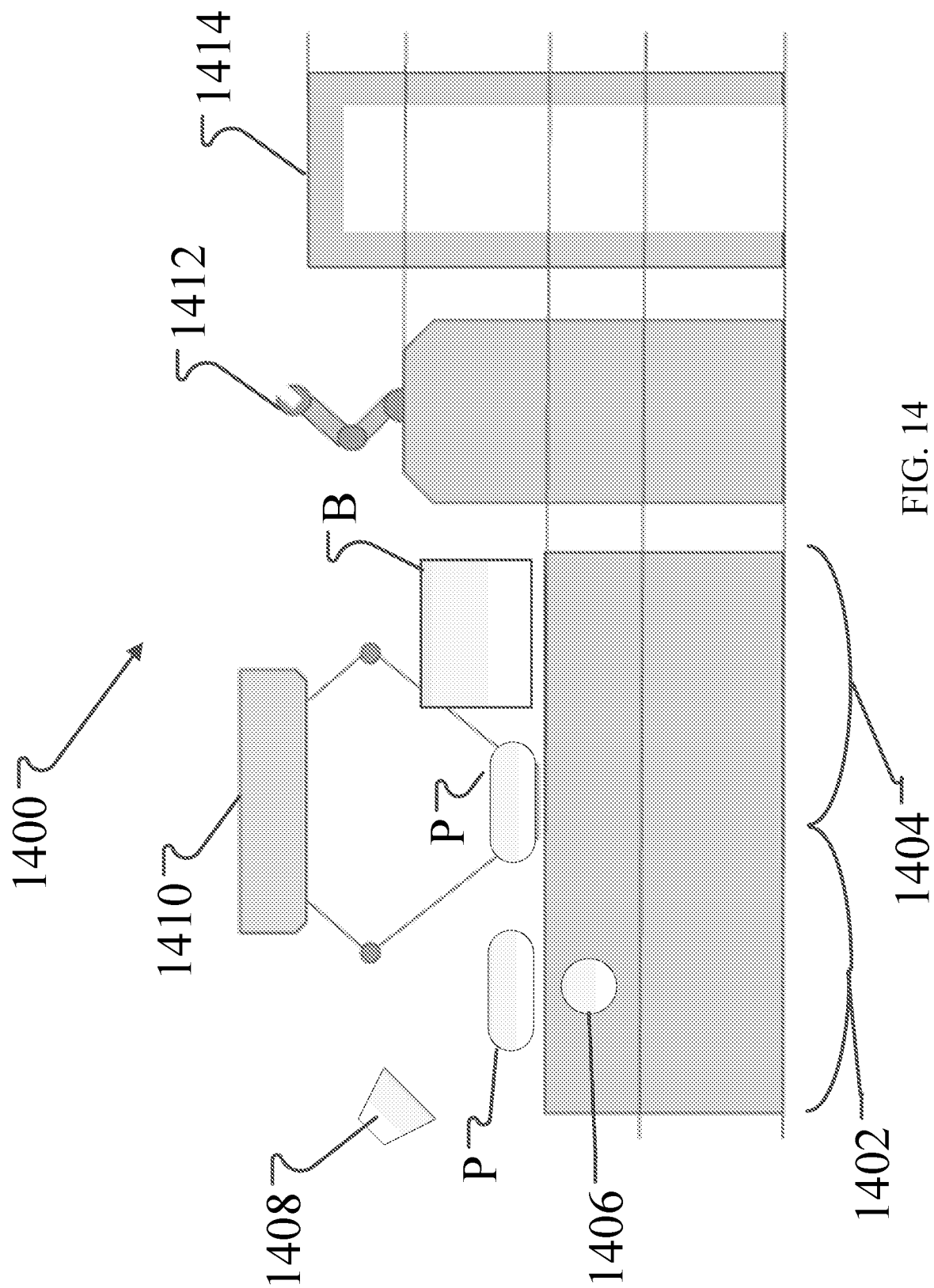
FIG. 14 depicts a partial schematic view of downstream stations of a production line, specifically, a quality control station and stacking station.

FIG. 14 depicts a partial schematic view of downstream stations 1400 of a production line, specifically, a quality control (QC) station 1402 and stacking station 1404. The QC station 1402 receives a molded fiber part P from a transfer system, such as the output conveyor in FIG. 13. The QC station includes a sensor 1408, such as an optical inspection device, and an emitter, such a light emitting element 1406. Light from the light emitting element 1406 is directed through the molded fiber part P and, if there are defects in the part, received by the sensor 1408. A defective molded fiber part P may be removed from the quality control station 1406 via a spider robot 1410 or other mechanism. In-spec molded fiber parts P may be placed in a box B by the spider robot 1410 for delivery to a customer. A box-moving robot 1412 moves a full box B to an exit conveyor 1414 so as to exit the production line for delivery. Out-of-spec parts may be automatically removed from the production line, for example by the spider robot 1410, and placed in an off-spec holding area (not shown) for further analysis and testing. Alternatively, if the off-spec part is suitable, it may be automatically routed to the slurry mixing system for recycling into raw slurry, described elsewhere herein.

Figure 15:
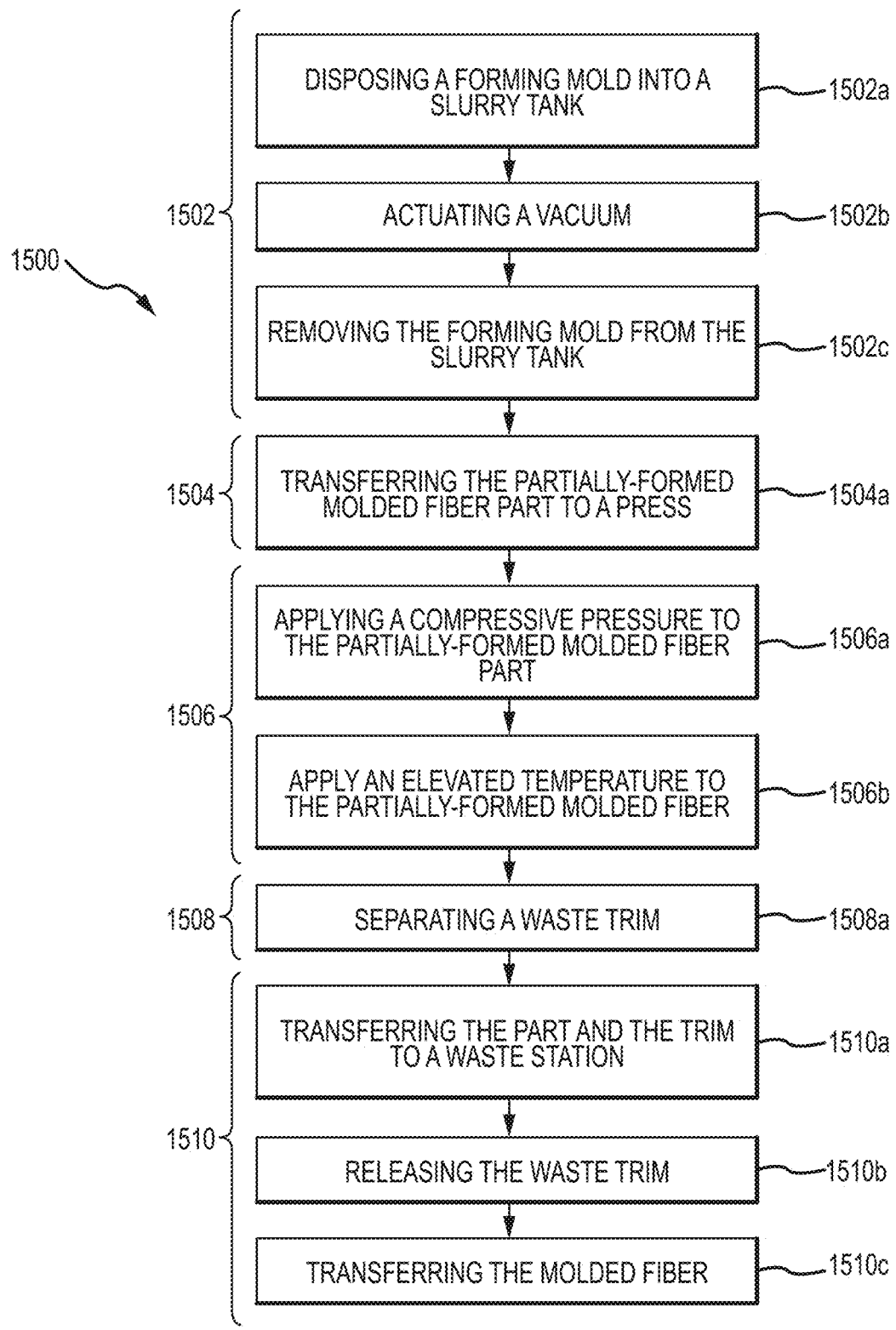
FIG. 15 depicts a method of producing a molded fiber part.

FIG. 15 depicts a method 1500 of producing a molded fiber part. The depicted method 1500 includes operations performed by the various components, system, and subsystems described herein. The method 1500 includes, in one example, the following general operations: a forming operation 1502, a transferring operation 1504, a pressing operation 1506, a trimming operation 1508, and a removing operation 1510. The various general operations (e.g., forming 1502, transferring 1504, pressing 1506, etc.), as well as specific operations (e.g., in the context of the general forming operation 1502: a disposing operation, an actuating operation, a removing operation) are also depicted. Additional operations of certain general operations are further described in other figures identified in FIG. 15 and the following description, but are optional to the method 1500 depicted in FIG. 15. Further, certain operations depicted in FIG. 15 may also be optional and not performed in alternative methods. Additionally, in certain alternative methods, there may exist some overlap between general and/or specific operations performed by discrete components (e.g., a combination press/trim station may perform both press and trim operations substantially simultaneously). With these considerations in mind, the method 1500 depicted in FIG. 15, as well as the general operations depicted in FIGS. 15A-15D, are described concurrently.

Figure 15A:
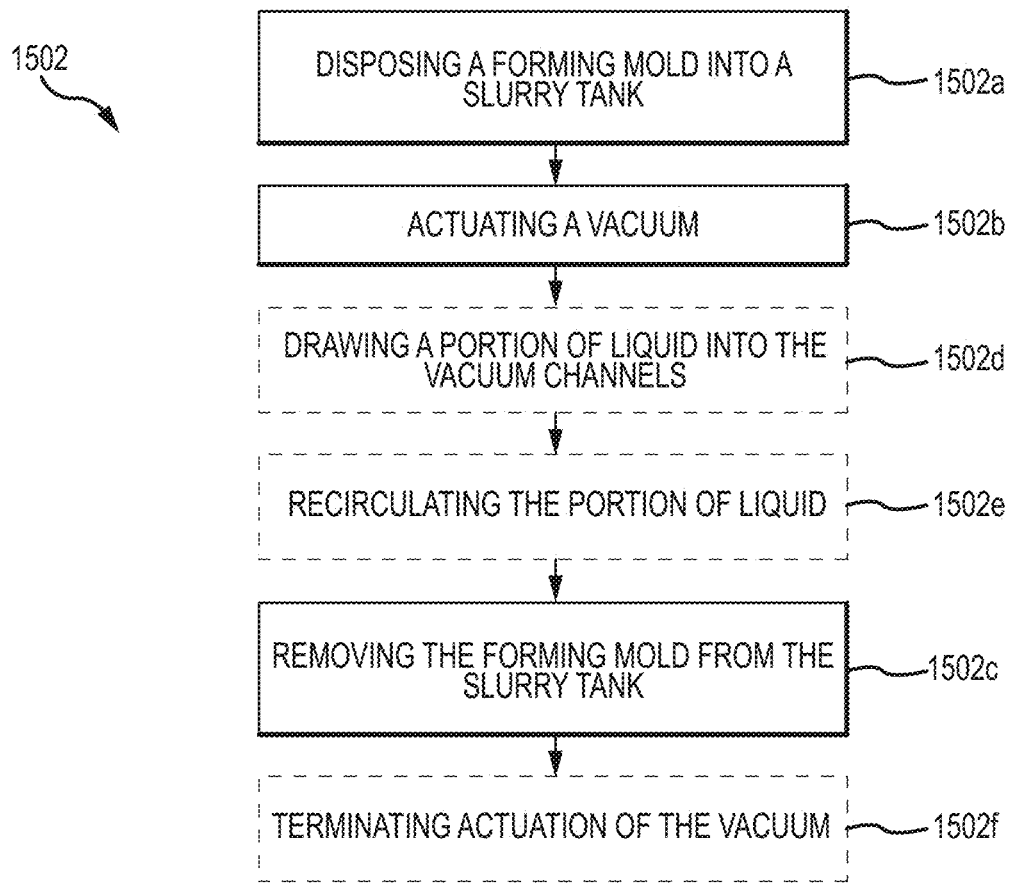
FIGS. 15A-15D depict forming, transferring, pressing, and removing operations of the method of FIG. 15.

The forming operation 1502 (as depicted in FIGS. 15 and 15A) includes, at operation 1502a, disposing a forming mold defining a plurality of vacuum channels into a slurry tank. The slurry tank includes a slurry, such as described with more specificity herein, but that generally includes a plurality of fibers and a liquid. In operation 1502b, the forming operation 1502 includes actuating a vacuum communicatively coupled to the plurality of vacuum channels to draw at least some of the plurality of fibers onto the forming mold to form a partially-formed molded fiber part. Actuating the vacuum 1502b includes drawing a portion of the liquid into the plurality of vacuum channels upon actuation of the vacuum, operation 1502d. As described above, a portion of this liquid drawn under vacuum may be recirculated into the slurry tank, operation 1502e. Further details regarding processes associated with recirculating the liquid are described elsewhere herein. Operation 1502c includes removing the forming mold from the slurry tank. In this operation, an actuator moves the forming mold relative to the slurry tank so as to, e.g., lift the forming mold from the slurry tank. In operation 1502f, the method includes terminating actuation of the vacuum subsequent to removing the forming mold from the slurry tank. By terminating the vacuum once the forming mold is removed, additional liquid may be removed from the slurry that had been drawn onto the forming mold, which further dries the slurry disposed thereon.

Figure 15B:
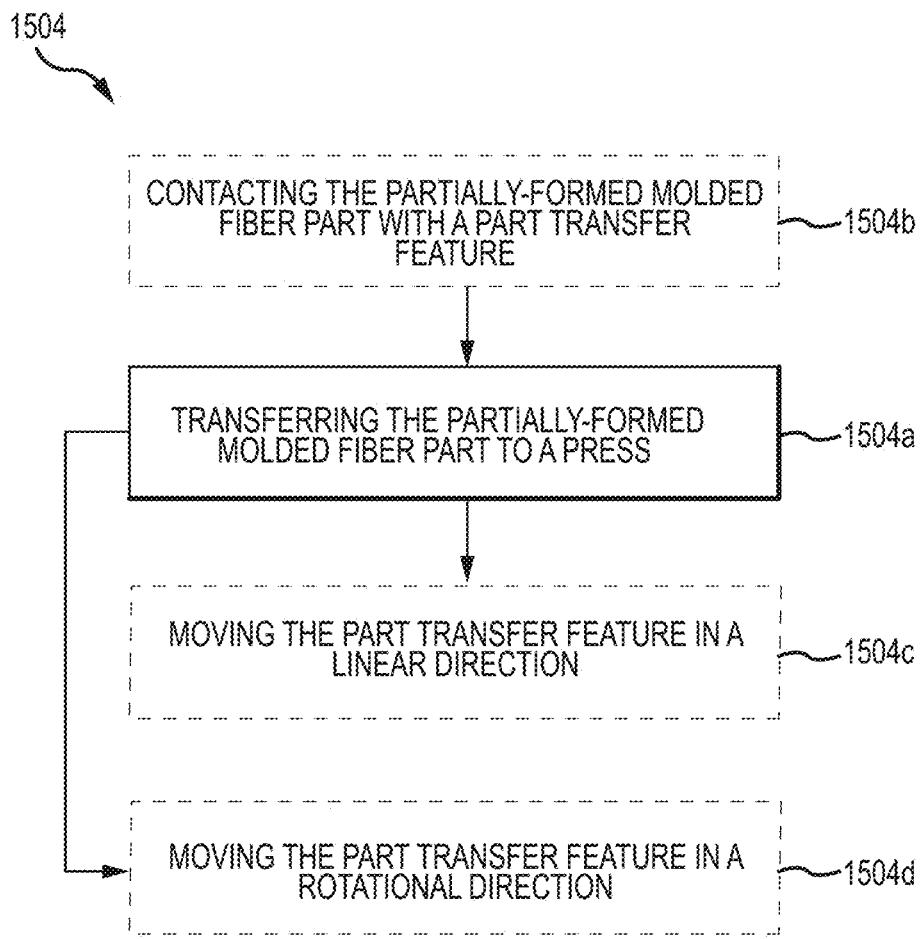

The transferring operation 1504 (as depicted in FIGS. 15 and 15B) includes, at operation 1504a, transferring the partially-formed molded fiber part to a press having a heating element. Prior to operation 1504a, in examples, the transferring operation 1504 may include contacting the partially-formed molded fiber part with a part transfer feature, operation 1504b. This contacting may be maintained for a predetermined period of time, which (depending on the pressure applied) extracts further liquid from the fiber slurry on the forming mold, as well as forms an outer surface of the partially-formed molded fiber part. Transferring the partially-formed molded fiber part may be performed with the part transfer feature. By using the part-transfer feature for this operation, the extraction and forming processes performed in operation 1504b may occur substantially simultaneously. In one example, transferring the partially-formed molded fiber part, operation 1504a, contemplates moving the part transfer feature in a linear direction, operation 1504c. This linear movement may be performed by the shuttle-based transfer systems described elsewhere herein. In another example, transferring the partially-formed molded fiber part, operation 1504a, contemplates moving the part transfer feature in a rotational direction, operation 1504d. This rotational movement may be performed by the robotic arm-based transfer systems described elsewhere herein.

Figure 15C:
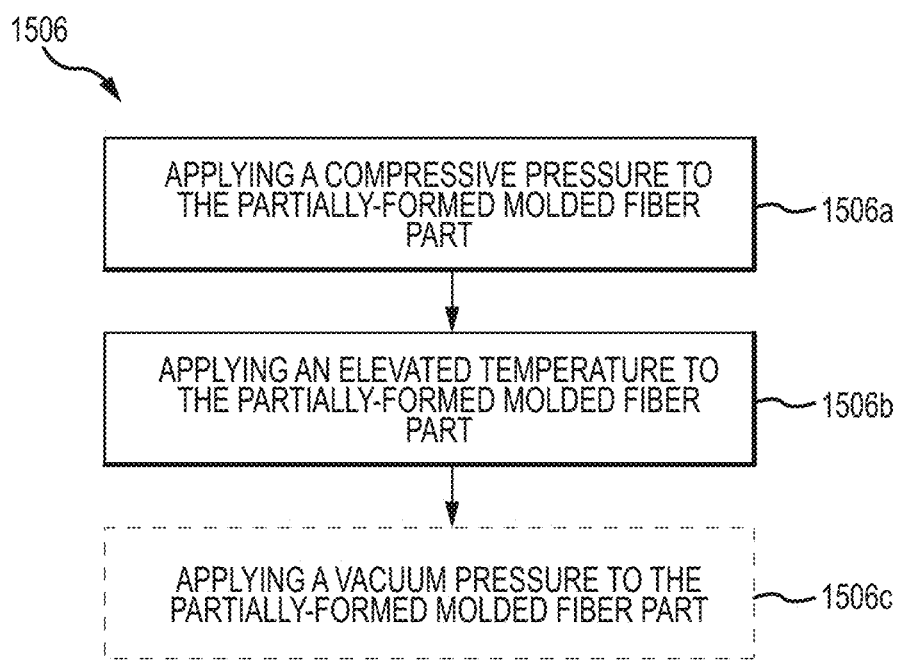

The pressing operation 1506 (as depicted in FIGS. 15 and 15C) includes, at operation 1506a, applying a compressive pressure to the partially-formed molded fiber part with the press. At operation 1506b, applying an elevated temperature to the partially-formed molded fiber part with the heating element is performed. Application of the compressive pressure and the elevated temperature is performed to substantially solidify the partially-formed molded fiber part into the molded fiber part. To further dry and solidify the molded fiber part, operation 1506c includes applying a vacuum pressure to the partially-formed molded fiber part with a vacuum source associated with the press. This vacuum application draws the liquid squeezed from the fiber due to the application of pressure away from the fiber; as such it may be desirable that the vacuum pressure is applied substantially simultaneously with the compressive pressure. The vacuum source that performs the vacuum operation may be communicatively coupled to vacuum channels present in either or both of the press molds (described above as core and cavity molds).

The trimming operation 1508 (as depicted in FIG. 15) includes, at operation 1508a, separating a waste trim from the formed molded fiber part. In examples, this may be performed substantially simultaneously with the application of the compressive pressure of operation 1506a. In such a case, then, the trimming operation 1508 would be performed on a combination press/trim station. In another example, the trimming operation 1508 may be performed after the application of the compressive pressure of operation 1506a. Of course, this would contemplate discrete press and trim stations.

Figure 15D:
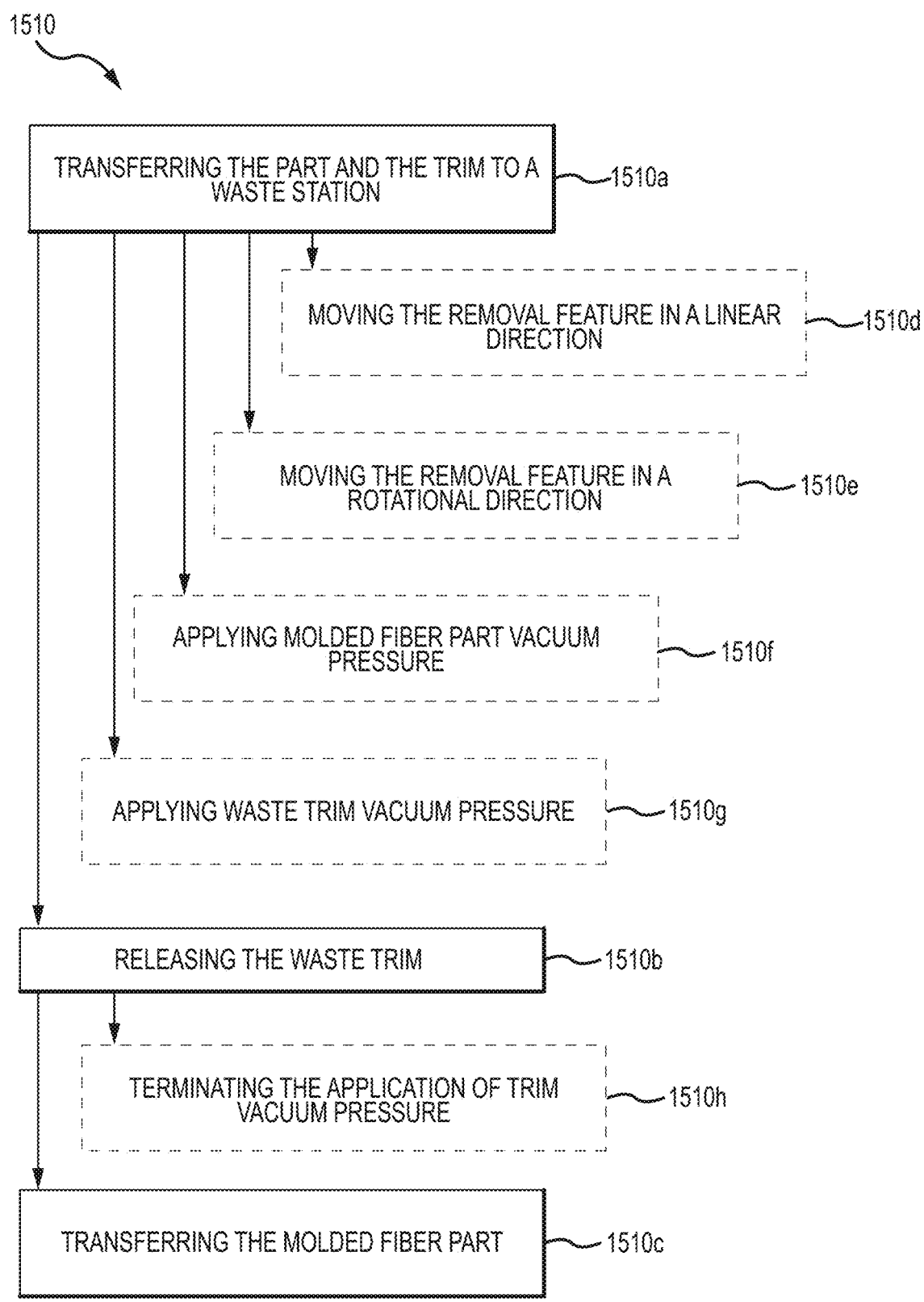

The removal operation 1510 (as depicted in FIGS. 15 and 15D) includes, at operation 1510a, transferring the molded fiber part and the waste trim to a waste station. In one example, transferring the formed molded fiber part and trim, operation 1510a, contemplates moving the part removal feature in a linear direction, operation 1510d. This linear movement may be performed by the shuttle-based transfer systems described elsewhere herein. In another example, transferring the partially-formed molded fiber part, operation 1510a, contemplates moving the part transfer feature in a rotational direction, operation 1510e. This rotational movement may be performed by the robotic arm-based transfer systems described elsewhere herein. The removal operation 1510 may be performed with a removal feature that, in examples, may be a removal mold having a plurality of vacuum ports, or a plurality of vacuum cups, one or more of which may be dedicated to a particular molded fiber part and/or piece of waste trim being transferred. The vacuum source that performs the vacuum operation may be communicatively coupled to vacuum channels present in the part removal feature. Different vacuum channels and sources may be communicatively coupled to ports on the part removal featured located to as to remove the formed fiber part or the waste trim. Thus, the transferring operation 1510a contemplates applying a molded fiber part vacuum pressure to the plurality of molded fiber part vacuum channels, operation 1510f, as well as applying a waste trim vacuum pressure to the plurality of waste trim vacuum channels, operation 1510g. In examples, the waste trim is released from the removal feature at the waste station, operation 1510b. Releasing may occur by terminating the application of the waste trim vacuum pressure, operation 1510h. Once the trim is released, the molded fiber part may be transferred to a downstream station, operation 1510c.

Figure 16:
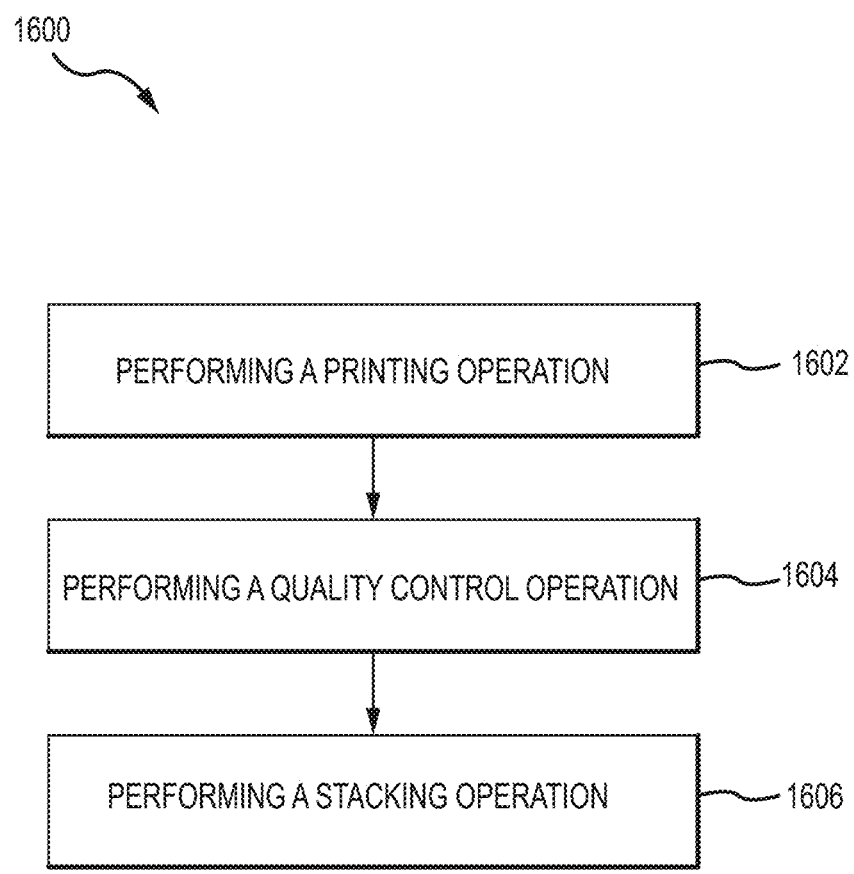
FIG. 16 depicts a method of performing downstream operations from the method of FIG. 15.

FIG. 16 depicts a method of performing downstream operations 1600, which may be performed in addition to the method 1500 of FIG. 15. These operations may include performing any or all of a printing operation 1602, performing a quality control operation 1604, and performing a stacking operation 1606. These former two operations 1602, 1604 are described in more details in FIGS. 16A and 16B, respectively. The latter operation, the stacking operation 1606 contemplates stacking a plurality of molded fiber parts.

Figure 16A:
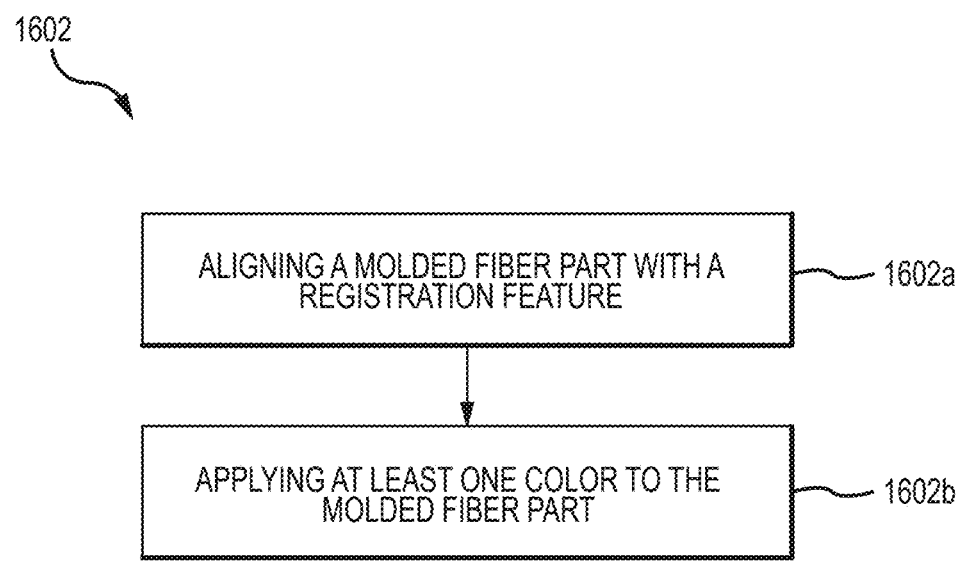
FIGS. 16A-16B depict printing and quality control operations of the method of FIG. 16.

The printing operation 1602 (as depicted in FIGS. 16 and 16A) includes, at operation 1602a, aligning the molded fiber part with a registration feature. Thereafter, the printing operation 1602 includes applying at least one color to the molded fiber part.

Figure 16B:
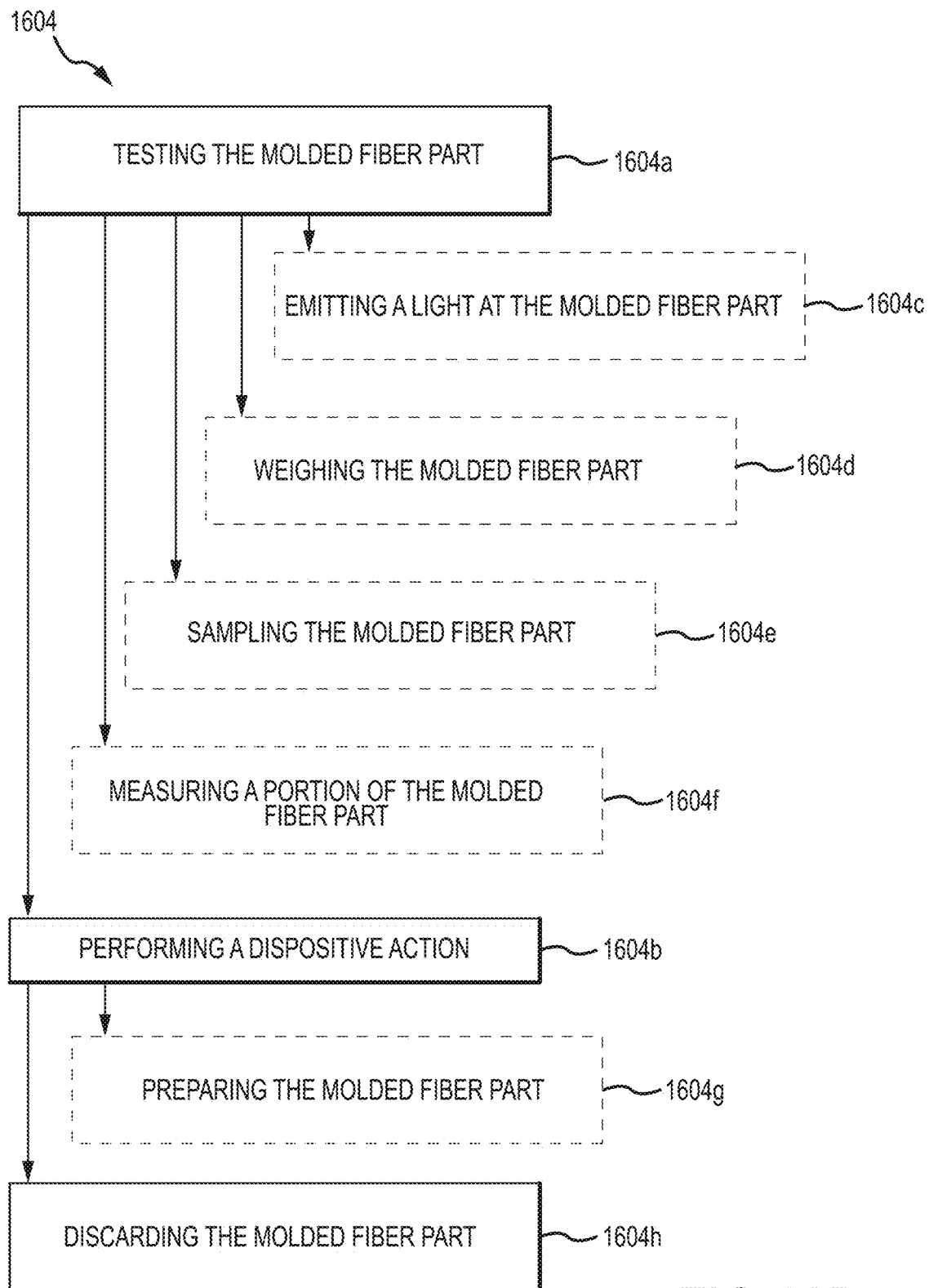

The quality control operation 1604 (as depicted in FIGS. 16 and 16B) includes, at operation 1604a, testing the molded fiber part. Testing may include at least one of emitting a light at the molded fiber part, operation 1604c, weighing the molded fiber part, operation 1604d, sampling the molded fiber part, operation 1604e, and measuring a portion of the molded fiber part, operation 1604f. Subsequent to testing, operation 1604b contemplates performing a dispositive action based at least in part on the testing of the molded fiber part. Such dispositive action may include at least one of preparing the molded fiber part for shipping, operation 1604g, and discarding the molded fiber part, operation 1604h.

Figure 17:
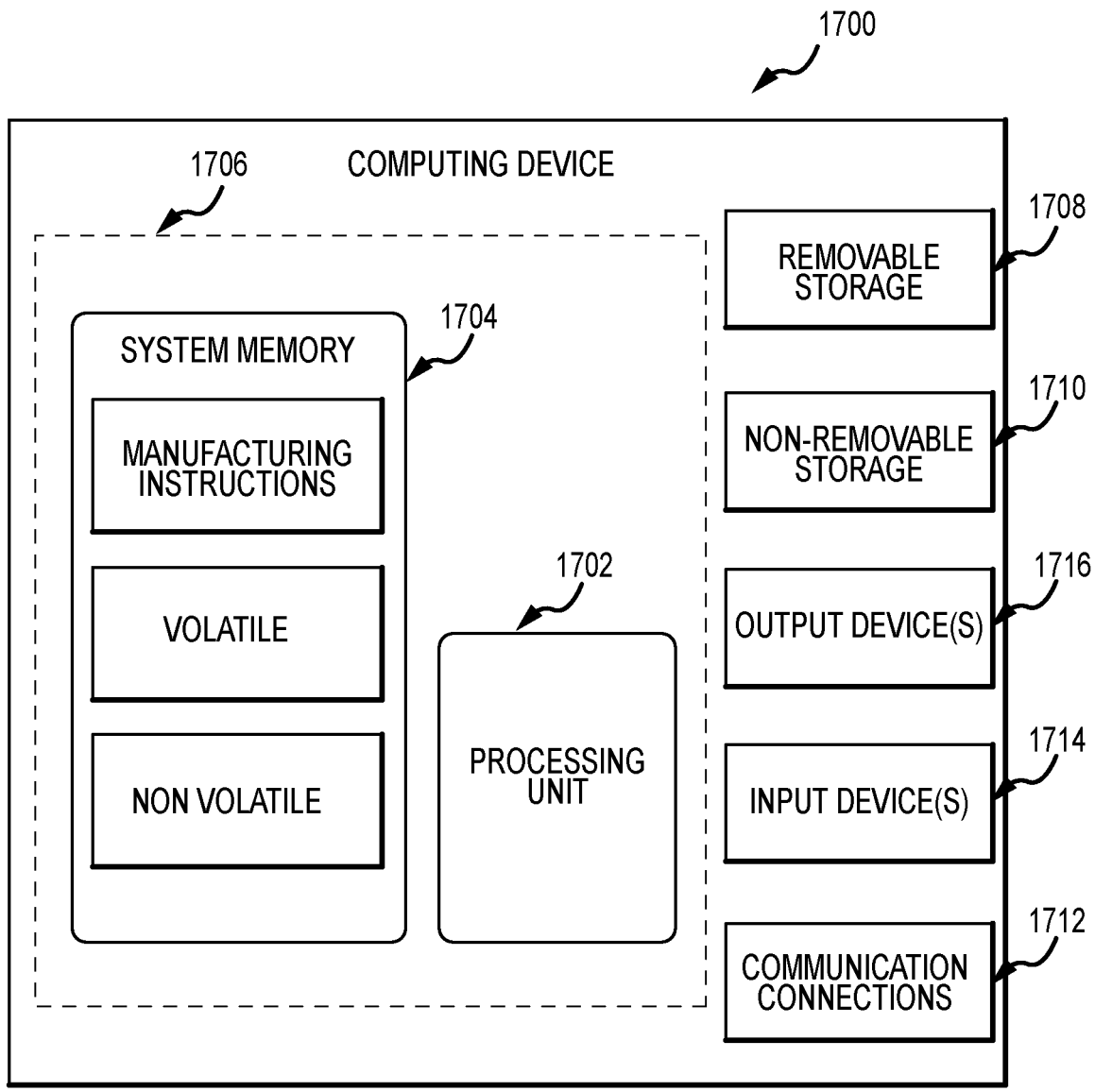
FIG. 17 illustrates one example of a suitable operating environment in which one or more of the present examples may be implemented.

FIG. 17 illustrates one example of a suitable operating environment 1700 in which one or more of the present examples may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, smartphones, tablets, distributed computing environments that include any of the above systems or devices, and the like. In examples, the computing system may include one or more product manufacturing management systems, which may be a single unit dedicated to all stations, systems, and subsystems of the examples of productions lines described herein. In other examples, the computing system may be a network of individual computing systems (e.g., one or more discrete computing systems for each station, system, and subsystem).

In its most basic configuration, operating environment 1700 typically includes at least one processing unit 1702 and memory 1704. Depending on the exact configuration and type of computing device, memory 1704 (storing, among other things, instructions to manufacture molded fiber parts as described herein) may be volatile (such as RAM), non-volatile (such as ROM, flash memory, etc.), or some combination of the two. This most basic configuration is illustrated in FIG. 17 by dashed line 1706. Further, environment 1700 may also include storage devices (removable, 1708, and/or non-removable, 1710) including, but not limited to, magnetic or optical disks or tape. Similarly, environment 1700 may also have input device(s) 1714 such as touch screens, keyboard, mouse, pen, voice input, etc. and/or output device(s) 1716 such as a display, speakers, printer, etc. Also included in the environment may be one or more communication connections, 1712, such as LAN, WAN, point to point, Bluetooth, RF, etc.

Operating environment 1700 typically includes at least some form of computer readable media. Computer readable media can be any available media that can be accessed by processing unit 1702 or other devices utilizing the operating environment. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

In some embodiments, the components described herein include such modules or instructions executable by computer system 1700 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 1700 is part of a network that stores data in remote storage media for use by the computer system 1700.

Figure 18:
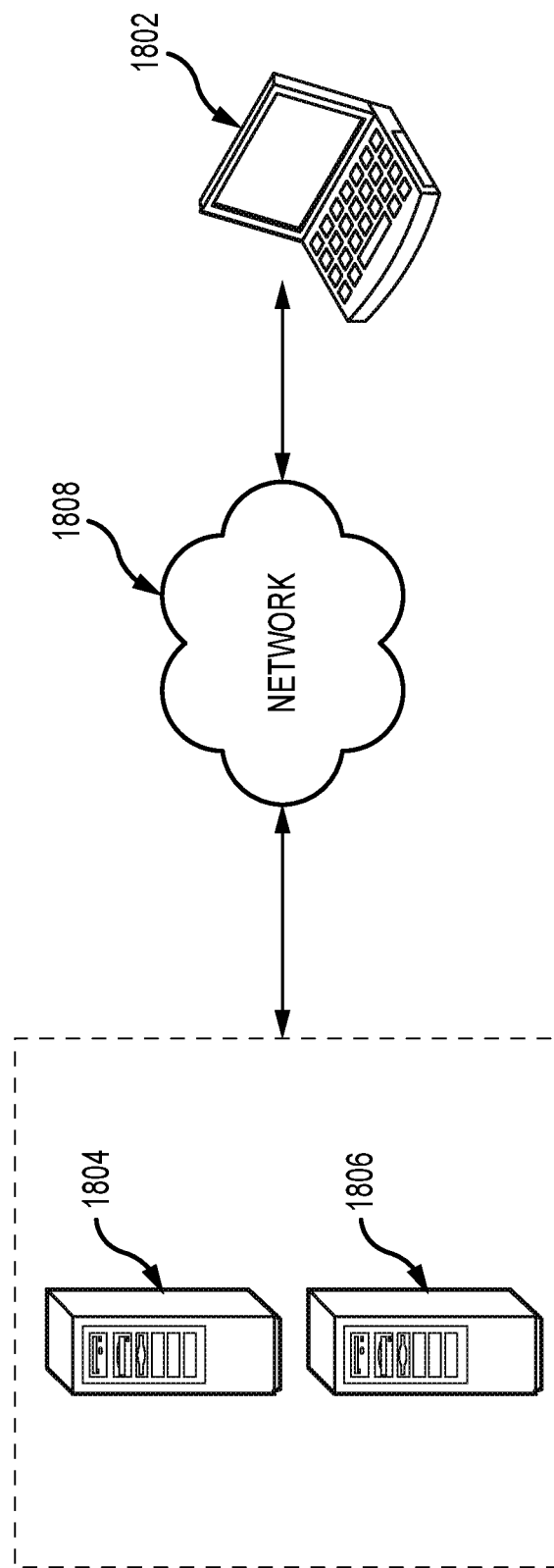
FIG. 18 is an example of a network in which the various systems and methods disclosed herein may operate.

FIG. 18 is an embodiment of a network 1800 in which the various systems and methods disclosed herein may operate. In embodiments, portable device, such as client device 1802, may communicate with one or more servers, such as servers 1804 and 1806, via a network 1808. In embodiments, a client device may be a laptop, a tablet, a personal computer, a smart phone, a PDA, a netbook, or any other type of computing device, including individual controllers for various components of the packing system, and the computing device in FIG. 17. In embodiments, servers 1804 and 1806 may be any type of computing device, such as the computing device illustrated in FIG. 17. Network 1808 may be any type of network capable of facilitating communications between the client device and one or more servers 1804 and 1806. Examples of such networks include, but are not limited to, LANs, WANs, cellular networks, and/or the Internet.

In embodiments, the various systems and methods disclosed herein may be performed by one or more server devices. For example, in one embodiment, a single server, such as server 1804 may be employed to perform the systems and methods disclosed herein. Portable device 1802 may interact with server 1804 via network 1808 in send testing results from the device being tested for analysis or storage. In further embodiments, the portable device 1802 may also perform functionality disclosed herein, such as by collecting and analyzing testing data.

In alternate embodiments, the methods and systems disclosed herein may be performed using a distributed computing network, or a cloud network. In such embodiments, the methods and systems disclosed herein may be performed by two or more servers, such as servers 1804 and 1806. Although a particular network embodiment is disclosed herein, one of skill in the art will appreciate that the systems and methods disclosed herein may be performed using other types of networks and/or network configurations.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A molded fiber part production line comprising:
    (a) a forming station comprising:
        a slurry tank configured to receive a fiber slurry comprising a plurality of fibers and a liquid;
        a forming mold comprising a mold plate defining a plurality of vacuum channels; and
        a mold actuation system for adjusting a position of the mold plate relative to the slurry tank;
    (b) a part transfer system comprising:
        a part transfer feature defining a plurality of part vacuum channels; and
        a conveyance mechanism for moving the part transfer feature from a first position in engagement with the forming mold to a second position;
    (c) a press station comprising:
        a core mold;
        a cavity mold compatible with the core mold, wherein at least one of the core mold and the cavity mold comprises a trimmer, and wherein the trimmer and the at least one of the core mold and the cavity mold form a unitary part; and
        a press actuation system for adjusting a position of the core mold relative to the cavity mold, wherein at least one of the core mold and the cavity mold comprises a plurality of vacuum channels, a plurality of heating elements, and a plurality of temperature sensors, wherein the core mold and the cavity mold are divided into multiple segments and a temperature of each segment is independently monitored and controlled, and wherein in the second position, the part transfer feature is in engagement with at least one of the core mold and the cavity mold; and
    (d) a removal system comprising:
        a removal feature defining a plurality of part vacuum channels and a plurality of trim vacuum channels; and
        a conveyance mechanism for moving the removal feature from a third position in engagement with at least one of the core mold and the cavity mold to a fourth position.

2. The molded fiber part production line of claim 1, wherein the part transfer feature comprises a part transfer mold compatible with the forming mold.

3. The molded fiber part production line of claim 1, wherein the part transfer system conveyance mechanism comprises a robotic arm.

4. The molded fiber part production line of claim 1, wherein both of the core mold and the cavity mold comprise the plurality of vacuum channels.

5. The molded fiber part production line of claim 1, wherein both of the core mold and the cavity mold comprise the plurality of heating elements.

6. The molded fiber part production line of claim 1, wherein the removal feature comprises a removal mold.

7. The molded fiber part production line of claim 1, wherein the removal feature comprises a plurality of vacuum cups.

8. The molded fiber part production line of claim 1, wherein the removal system conveyance mechanism comprises a robotic arm.

9. The molded fiber part production line of claim 1, wherein the removal system is the part transfer system.

10. The molded fiber part production line of claim 1, further comprising a trim station, and wherein when in the fourth position, the removal feature is in engagement with the trim station.

11. The molded fiber part production line of claim 10, wherein the trim station comprises a registration feature and trimmer.

12. The molded fiber part production line of claim 11, wherein the trimmer comprises a ring-shaped projection extending from the registration feature.

13. The molded fiber part production line of claim 11, wherein the trimmer is fixed relative to the registration feature.

14. The molded fiber part production line of claim 13, wherein the trimmer and the registration feature comprise a unitary part.

15. The molded fiber part production line of claim 1, wherein each vacuum channel in the plurality of vacuum channels is connected to a dedicated vacuum source.

16. The molded fiber part production line of claim 1, wherein each segment from the multiple segments includes one or more of the temperature sensors and one or more of the heating elements.

* * * * *